US008441147B2

(12) United States Patent
Hammond

(10) Patent No.: US 8,441,147 B2
(45) Date of Patent: May 14, 2013

(54) DEVICE AND SYSTEM FOR BYPASSING A POWER CELL OF A POWER SUPPLY

(75) Inventor: Peter Willard Hammond, Greensburg, PA (US)

(73) Assignee: Siemens Industry, Inc., Alpharetta, GA (US)

( * ) Notice: Subject to any disclaimer, the term of this patent is extended or adjusted under 35 U.S.C. 154(b) by 388 days.

(21) Appl. No.: 12/857,630

(22) Filed: Aug. 17, 2010

(65) Prior Publication Data

US 2010/0301975 A1 Dec. 2, 2010

Related U.S. Application Data

(63) Continuation-in-part of application No. 11/857,646, filed on Sep. 19, 2007, now Pat. No. 7,800,254, and a continuation-in-part of application No. 12/209,467, filed on Sep. 12, 2008, now Pat. No. 8,093, 764.

(60) Provisional application No. 60/848,153, filed on Sep. 28, 2006, provisional application No. 60/971,965, filed on Sep. 13, 2007, provisional application No. 60/971,972, filed on Sep. 13, 2007.

(51) Int. Cl.
*H02J 1/10* (2006.01)

(52) U.S. Cl.
USPC .......................................................... 307/29

(58) Field of Classification Search ................ 307/29
See application file for complete search history.

(56) References Cited

U.S. PATENT DOCUMENTS

| 3,278,886 | A | * | 10/1966 | Blumenberg et al. | ......... 439/683 |
| 3,327,221 | A | * | 6/1967 | Rieth | ......... 455/180.2 |
| 3,450,949 | A | * | 6/1969 | Inglis | ......... 361/104 |
| 3,470,504 | A | * | 9/1969 | Mallory et al. | ......... 335/78 |
| 6,222,284 | B1 | * | 4/2001 | Hammond et al. | ......... 307/125 |

* cited by examiner

Primary Examiner — Robert L. DeBeradinis

(57) ABSTRACT

A bypass device for bypassing a power cell of a multi-cell device. The bypass device includes a stationary portion of a first set of contacts connected to at least first and second output terminals of a power cell, a magnetically latching solenoid that, when energized, moves a moving portion of the first set of contacts from a first position to a second position or from the second position to the first position, and at least one added insulating material positioned between the solenoid and the first set of contacts, and configured to allow a voltage between the magnetically latching solenoid and the first and second output terminals of the power cell to exceed a voltage between said output terminals.

17 Claims, 21 Drawing Sheets

DEVICE AND SYSTEM FOR BYPASSING A POWER CELL OF A POWER SUPPLY

CROSS REFERENCE TO RELATED APPLICATIONS

This application is a continuation-in-part of U.S. patent application Ser. No. 11/857,646 filed Sep. 19, 2007, which claims the priority benefit of U.S. Provisional Patent Application No. 60/848,153, filed on Sep. 28, 2006. This application is also a continuation-in-part of U.S. patent application Ser. No. 12/209,467 filed Sep. 12, 2008, which claims the priority benefit of U.S. Provisional Patent Application Nos. 60/971,965 and 60/971,972, both filed on Sep. 13, 2007. The contents of both U.S. patent application Ser. Nos. 11/857,646 and 12/209,467 are hereby incorporated by reference in their entirety.

BACKGROUND

This application discloses an invention that is related, generally and in various embodiments, to a system for bypassing a power cell in a multi-cell power supply.

In certain applications, multi-cell power supplies utilize modular power cells to process power between a source and a load. Such modular power cells can be applied to a given power supply with various degrees of redundancy to improve the availability of the power supply. For example, FIG. 1 illustrates various embodiments of a power supply (e.g., an AC motor drive) having nine such power cells. The power cells in FIG. 1 are represented by a block having input terminals A, B, and C; and output terminals T1 and T2. In FIG. 1, a transformer or other multi-winding device 110 receives three-phase, medium-voltage power at its primary winding 112, and delivers power to a load 130 such as a three-phase AC motor via an array of single-phase inverters (also referred to as power cells). Each phase of the power supply output is fed by a group of series-connected power cells, called herein a "phase-group".

The transformer 110 includes primary windings 112 that excite a number of secondary windings 114-122. Although primary winding 112 is illustrated as having a star configuration, a mesh configuration is also possible. Further, although secondary windings 114-122 are illustrated as having a delta or an extended-delta configuration, other configurations of windings may be used as described in U.S. Pat. No. 5,625,545 to Hammond, the disclosure of which is incorporated herein by reference in its entirety. In the example of FIG. 1 there is a separate secondary winding for each power cell. However, the number of power cells and/or secondary windings illustrated in FIG. 1 is merely exemplary, and other numbers are possible. Additional details about such a power supply are disclosed in U.S. Pat. No. 5,625,545.

Any number of ranks of power cells are connected between the transformer 110 and the load 130. A "rank" in the context of FIG. 1 is considered to be a three-phase set, or a group of three power cells established across each of the three phases of the power delivery system. Referring to FIG. 1, rank 150 includes power cells 151-153, rank 160 includes power cells 161-163, and rank 170 includes power cells 171-173. A master control system 195 sends command signals to local controls in each cell over fiber optics or another wired or wireless communications medium 190. It should be noted that the number of cells per phase depicted in FIG. 1 is exemplary, and more than or less than three ranks may be possible in various embodiments.

FIG. 2 illustrates various embodiments of a power cell 210 which is representative of various embodiments of the power cells of FIG. 1. The power cell 210 includes a three-phase diode-bridge rectifier 212, one or more direct current (DC) capacitors 214, and an H-bridge inverter 216. The rectifier 212 converts the alternating current (AC) voltage received at cell input 218 (i.e., at input terminals A, B and C) to a substantially constant DC voltage that is supported by each capacitor 214 that is connected across the output of the rectifier 212. The output stage of the power cell 210 includes an H-bridge inverter 216 which includes two poles, a left pole and a right pole, each with two switching devices. The inverter 216 transforms the DC voltage across the DC capacitors 214 to an AC output at the cell output 220 (i.e., across output terminals T1 and T2) using pulse-width modulation (PWM) of the semiconductor devices in the H-bridge inverter 216.

As shown in FIG. 2, the power cell 210 may also include fuses 222 connected between the cell input 218 and the rectifier 212. The fuses 222 may operate to help protect the power cell 210 in the event of a short-circuit failure. According to other embodiments, the power cell 210 is identical to or similar to those described in U.S. Pat. No. 5,986,909 and its derivative U.S. Pat. No. 6,222,284 to Hammond and Aiello, the disclosures of which are incorporated herein by reference in their entirety.

FIG. 3 illustrates various embodiments of a bypass device 230 connected to output terminals T1 and T2 of the power cell 210 of FIG. 2. In general, when a given power cell of a multi-cell power supply fails in an open-circuit mode, the current through all the power cells in that phase-group will go to zero, and further operation is not possible. A power cell failure may be detected by comparing a cell output voltage to the commanded output, by checking or verifying cell components, through the use of diagnostics routines, etc. In the event that a given power cell should fail, it is possible to bypass the failed power cell and continue to operate the multi-cell power supply at reduced capacity.

The bypass device 230 is a single pole single throw (SPST) contactor, and includes a contact 232 and a solenoid with a coil 234. As used herein, the term "contact" generally refers to a set of contacts having stationary portions and a movable portion. Similarly, as used herein the term "solenoid" refers to an assembly of one or more coils within a magnetic frame, and surrounding a magnetic armature to actuate movement of the armature or plunger. Accordingly, the contact 232 includes stationary portions and a movable portion which is controlled by the solenoid coil 234. The bypass device 230 may be installed as an integral part of a converter subassembly in a drive unit. In other applications the bypass device 230 may be separately mounted. When the movable portion of the contact 232 is in a bypass position, a shunt path is created between the respective output lines connected to output terminals T1 and T2 of the power cell 210. Stated differently, when the movable portion of the contact 232 is in a bypass position, the output of the failed power cell is shorted. Thus, when power cell 210 experiences a failure, current from other power cells in the phase group can be carried through the bypass device 230 connected to the failed power cell 210 instead of through the failed power cell 210 itself.

FIG. 4 illustrates various embodiments of a different bypass device 240 connected to output terminals T1 and T2 of the power cell 210. The bypass device 240 is a single pole double throw (SPDT) contactor, and includes a contact 242 and a solenoid with a coil 244. The contact 242 includes stationary portions and a movable portion which is controlled by the solenoid coil 244. When the movable portion of the contact 242 is in a bypass position, one of the output lines of the power cell 210 is disconnected (e.g., the output line connected to output terminal T2 in FIG. 4) and a shunt path is created between the output line connected to output terminal T1 of the power cell 210 and a downstream portion of the output line previously connected to output terminal T2 of the power cell 210. The shunt path carries current from other power cells in the phase group which would otherwise pass through the power cell 210. Thus, when power cell 210 experiences a failure, the output of the failed power cell is not shorted as is the case with the bypass configuration of FIG. 3.

The bypass devices shown in FIGS. 3 and 4 do not operate to disconnect power from any of the input terminals A, B or C in the event of a power cell failure. Thus, in certain situations, if the failure of a given power cell is not severe enough to cause the fuses 222 (see FIG. 2) to disconnect power to at least two of input terminals A, B or C, the failure can continue to cause damage to the given power cell.

SUMMARY

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this document is to be construed as an admission that the embodiments described in this document are not entitled to antedate such disclosure by virtue of prior invention. As used in this document, the term "comprising" means "including, but not limited to."

In one general respect, the embodiments disclose a bypass device. The bypass device includes a stationary portion of a first set of contacts connected to at least first and second output terminals of a power cell, a magnetically latching solenoid that, when energized, moves a moving portion of the first set of contacts from a first position to a second position or from the second position to the first position, and at least one added insulating material positioned between the solenoid and the first set of contacts, and configured to allow a voltage between the magnetically latching solenoid and the first and second output terminals of the power cell to exceed a voltage between said output terminals.

In another general respect, the embodiments disclose a system including a multi-winding device having a primary winding and a plurality of three-phase secondary windings, at least one power cell is connected to a three-phase secondary winding of the multi-winding device, and a bypass device. The bypass device includes a stationary portion of a first set of contacts connected to at least first and second output terminals of a power cell, a magnetically latching solenoid that, when energized, moves a moving portion of the first set of contacts from a first position to a second position or from the second position to the first position, and at least one added insulating material positioned between the solenoid and the first set of contacts, and configured to allow a voltage between the magnetically latching solenoid and the first and second output terminals of the power cell to exceed a voltage between said output terminals.

In another general respect, the embodiments disclose a system including a bypass device and a local control. The bypass device includes a stationary portion of a first set of contacts connected to at least first and second output terminals of a power cell, and a magnetically latching solenoid that, when energized, moves a moving portion of the first set of contacts from a first position to a second position or from the second position to the first position. The local control is operably connected to the bypass device and configured to operate at or near an electrical potential of the first set of contacts.

DETAILED DESCRIPTION

It is to be understood that at least some of the figures and descriptions of the invention have been simplified to focus on elements that are relevant for a clear understanding of the invention, while eliminating, for purposes of clarity, other elements that those of ordinary skill in the art will appreciate may also comprise a portion of the invention. However, because such elements are well known in the art, and because they do not necessarily facilitate a better understanding of the invention, a description of such elements is not provided herein.

Figure 5:
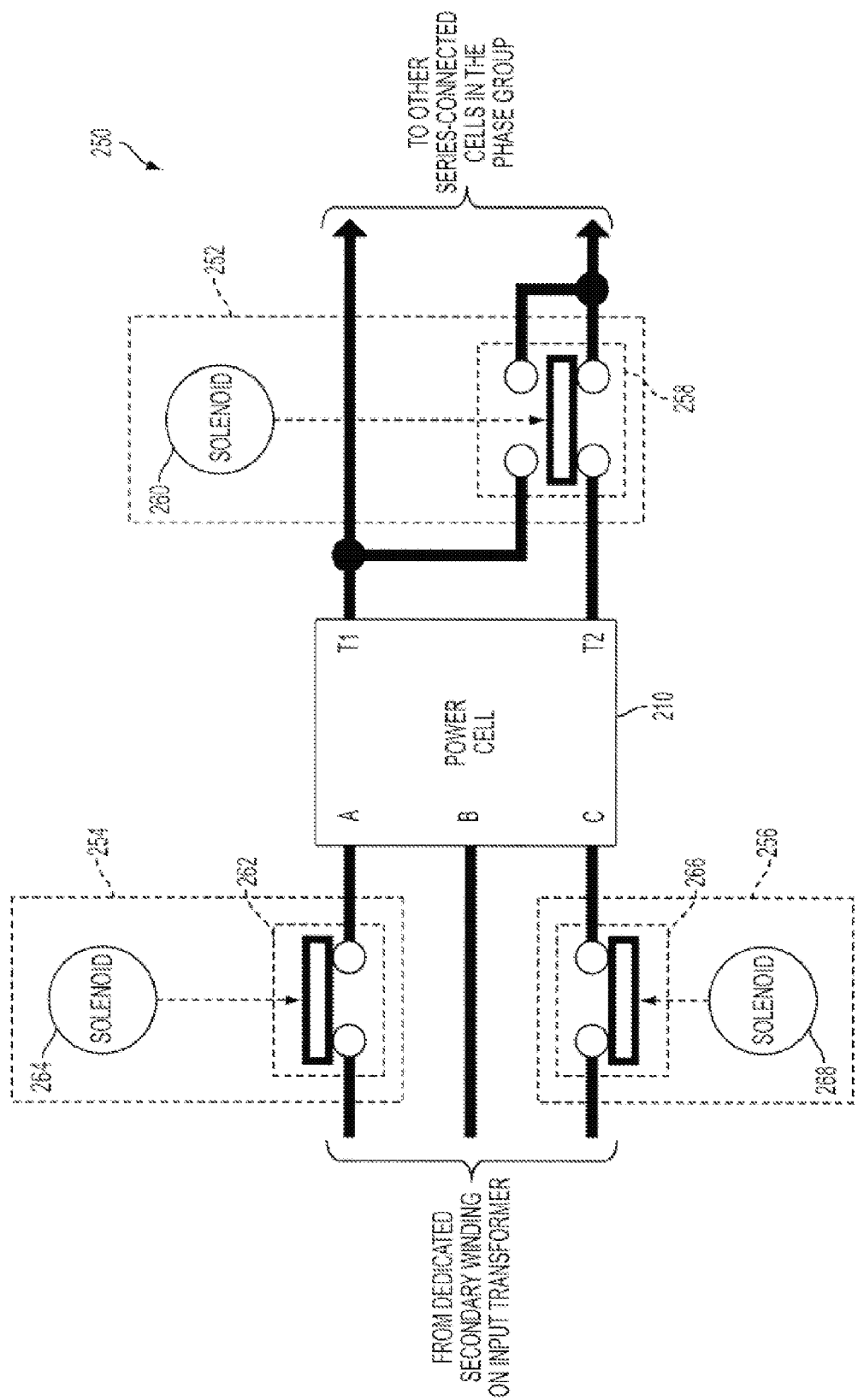
FIG. 5 illustrates various embodiments of a system for bypassing a power cell of a power supply.

FIG. 5 illustrates various embodiments of a system 250 for bypassing a power cell (e.g., power cell 210) of a power supply. As shown in FIG. 5, the system 250 includes bypass device 252 connected to the output terminals T1 and T2, a bypass device 254 connected to input terminal A, and a bypass device 256 connected to input terminal C. Although the system 250 is shown in FIG. 5 as having respective bypass devices connected to input terminals A and C, it will be appreciated that, according to other embodiments, the respective bypass devices may be connected to at least any two of the input terminals A, B and C, or to all three input terminals.

The bypass devices 252, 254, 256 may be mechanically-driven, fluid-driven, electrically-driven, or solid state, as is described in the '909 and '284 patents. For purposes of simplicity, each bypass device will be described hereinafter in the context of a bypass device which includes one or more electrically-driven contactors which are connected to a power cell. As described hereinafter, a given bypass device may be embodied as a single-pole single-throw (SPST) contactor, a single-pole double-throw (SPDT) contactor, or a multi-pole contactor.

Figure 4:
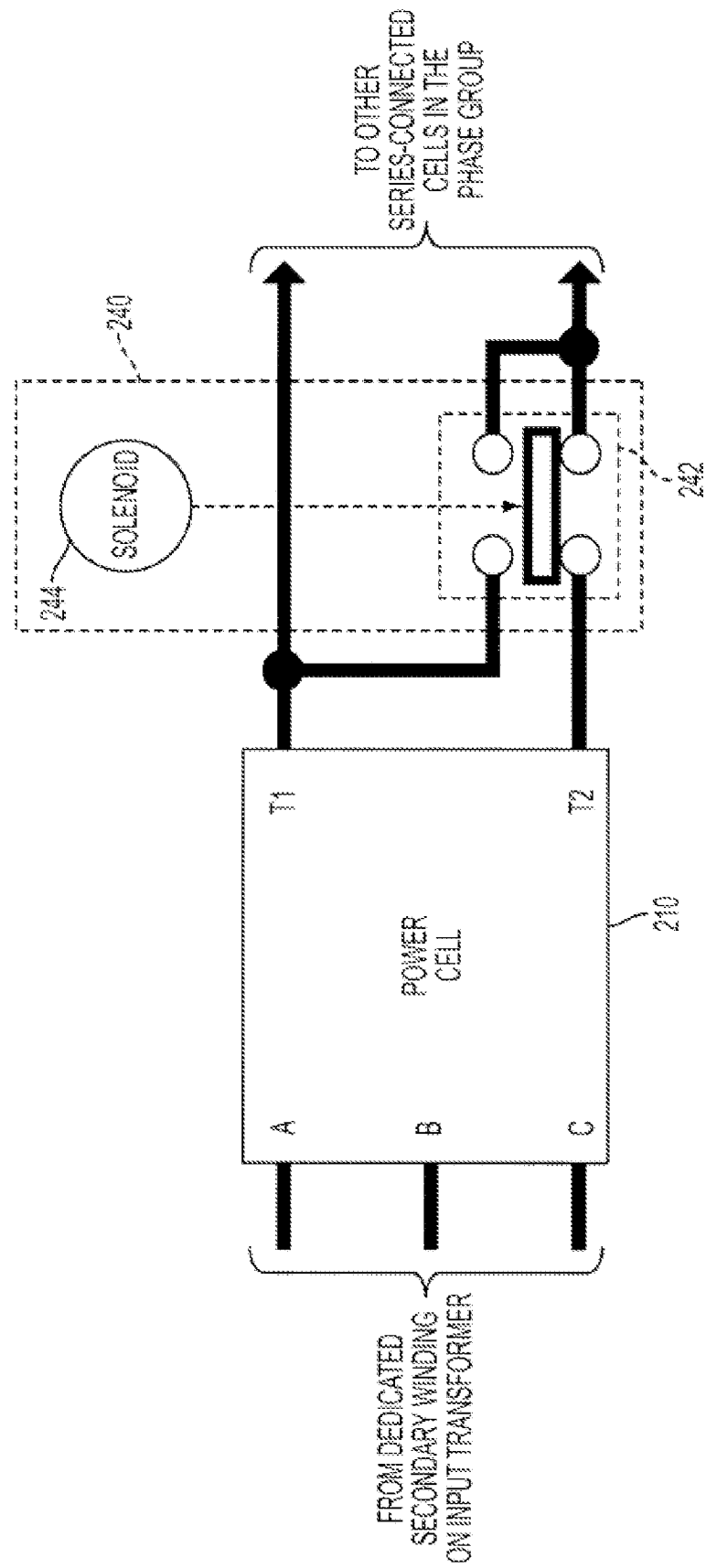
FIG. 4 illustrates various embodiments of a bypass device connected to an output of the power cell of FIG. 2.

Bypass device 252 is a single pole double throw (SPDT) contactor, and includes a contact 258 and a solenoid 260. The contact 258 includes stationary portions and a movable portion which is controlled by the solenoid 260. The bypass device 252 operates in a manner similar to that described hereinabove with respect to bypass device 240 of FIG. 4. The bypass device 254 is a single pole single throw (SPST) contactor, and includes a contact 262 and a solenoid 264. The contact 262 includes stationary portions and a movable portion which is controlled by the solenoid 264. The bypass device 256 is a single pole single throw (SPST) contactor, and includes a contact 266 and a solenoid 268. The contact 266 includes stationary portions and a movable portion which is controlled by the solenoid 268. In general, in the event of a failure, bypass devices 254, 256 disconnect the cell input power at substantially the same time that bypass device 252 creates a shunt path for the current that formerly passed through the output of the failed power cell.

Figure 2:
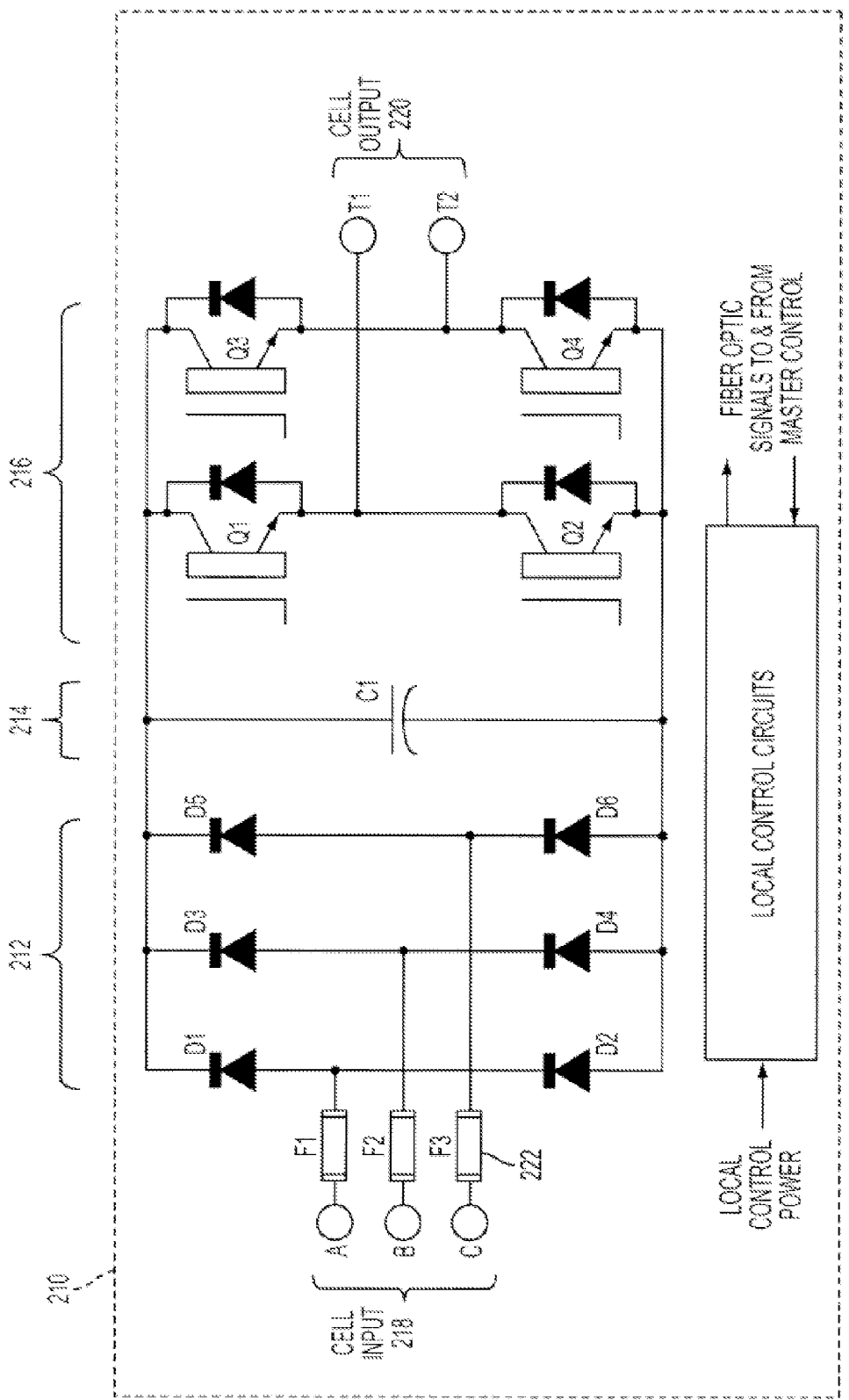
FIG. 2 illustrates various embodiments of a power cell of the power supply of FIG. 1.
Figure 3:
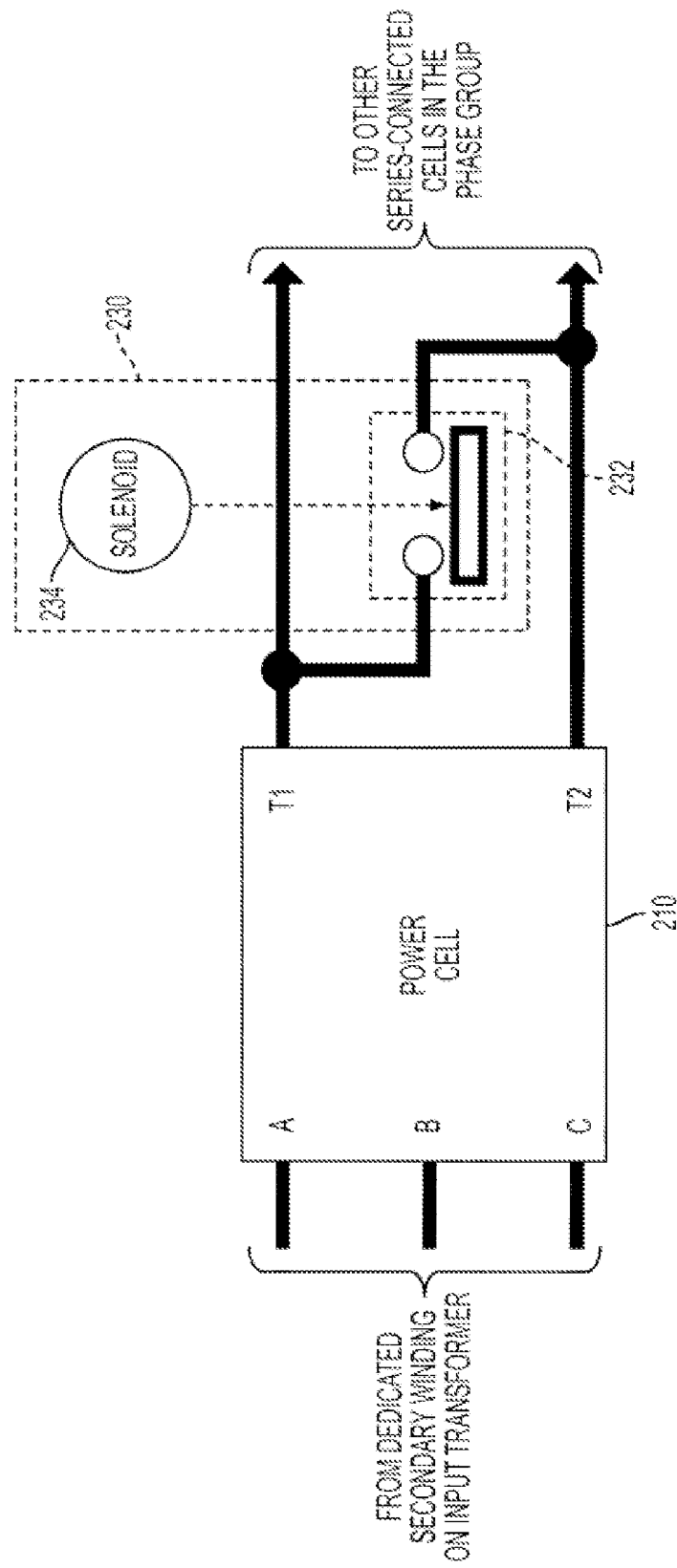
FIG. 3 illustrates various embodiments of a bypass device connected to an output of the power cell of FIG. 2.

The condition associated with the creation of the described shunt path and the disconnection of cell input power from at least two of the cell input terminals may be referred to as "full-bypass". When the full bypass condition is present, no further power can flow into the failed cell. As described with respect to FIG. 2, the fuses 222 of the power cell may operate to help protect the power cell in the event of a short-circuit failure. However, in certain situations (e.g., when fault current is low), the fuses 222 may not clear quickly enough to prevent further damage to the failed power cell. According to various embodiments, the bypass devices 254, 256 may act quicker than the fuses 222, and the quicker action generally results in less damage to the failed power cell.

Figure 6:
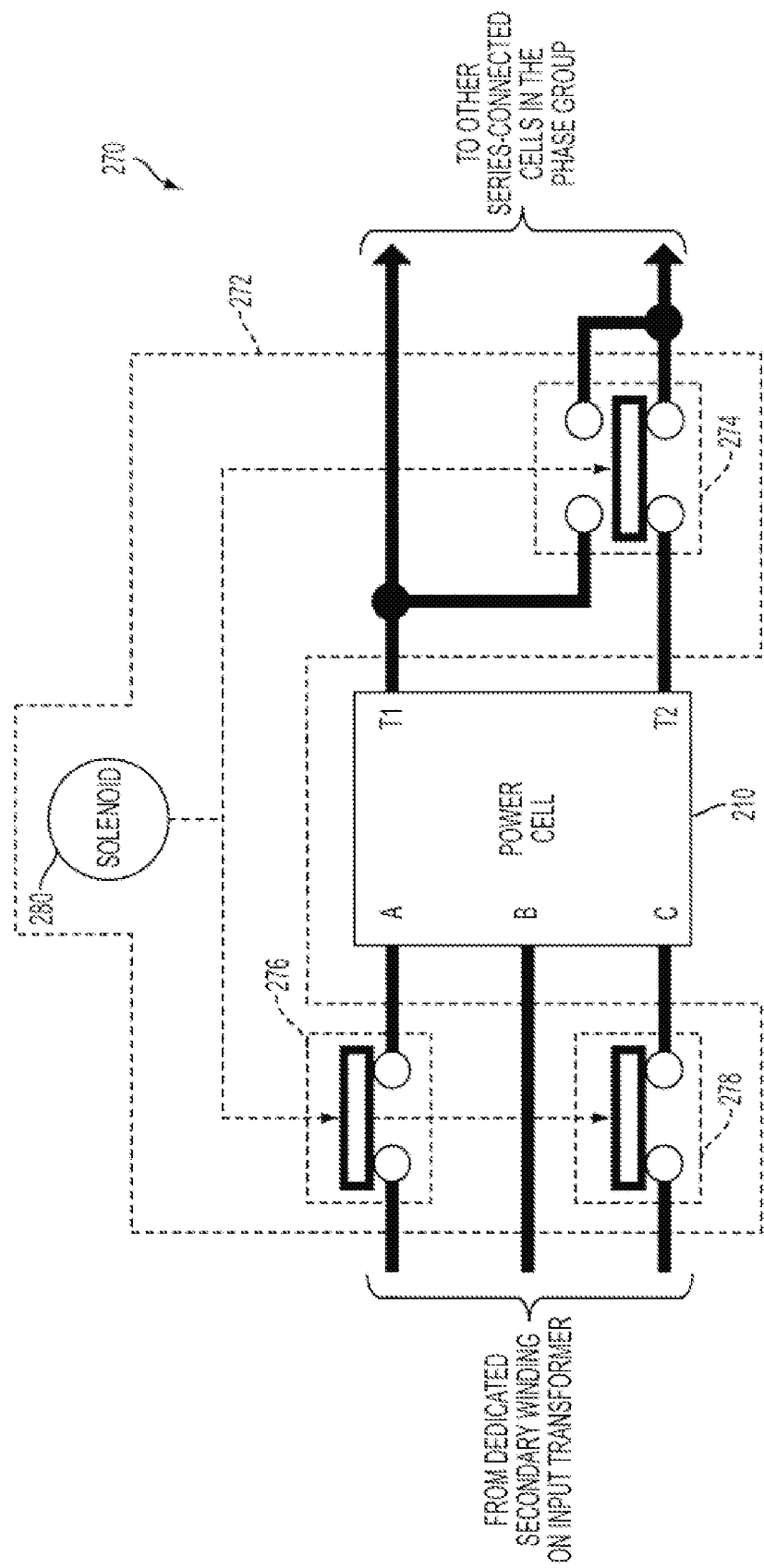
FIG. 6 illustrates various embodiments of a system for bypassing a power cell of a power supply.

FIG. 6 illustrates various embodiments of a system 270 for bypassing a power cell (e.g., power cell 210) of a power supply. The system 270 includes a single bypass device 272 which achieves the combined functionality of the bypass devices 252, 254, 256 of FIG. 5. The bypass device 272 is a multi-pole contactor which includes a first contact 274 connected to the output terminals T1 and T2 of the power cell, a second contact 276 connected to the input terminal A, and a third contact 278 connected to the input terminal C. Each of the contacts 274, 276, 278 include stationary portions and a movable portion. Although the second and third contacts 276, 278 are shown in FIG. 6 as being connected to input terminals A and C, it will be appreciated that, according to other embodiments, the second and third contacts 276, 278 may be connected to any two of the input terminals A, B and C. The bypass device 272 also includes a single solenoid 280 which controls the movable portions of the contacts 274, 276, 278.

The previously discussed methods may be applied to contactors with conventional solenoids, specifically contactors that hold their contacts in a first position when the coil of a solenoid is not energized and hold their contacts in a second position when the coil of the solenoid is energized. However, it may be preferable to employ a magnetically latching solenoid for the contactor. As used herein, such a contactor will be referred to as a "magnetically latching contactor." Magnetically latching contactors include permanent magnets within the solenoid which hold their contacts in either the first or second position when the coil is not energized, and upon the application of a brief pulse of voltage to the coil, the contacts transfer to the other position (i.e., moving from a first position to a second position or moving from the second position to the first position). A magnetically latching contactor may employ only one coil in the solenoid, or may employ two coils connected in series. In this type of contactor, the direction of transfer of the contacts may be determined by the polarity of the voltage pulse applied to the coil or coils. Similarly, a magnetically latching contactor may employ two separately connected coils in the solenoid, such as the solenoid described in U.S. Pat. No. 3,022,450 to Chase. In this type of contactor, the direction of transfer of the contacts may be determined by which of the two coils is energized. A two-coil magnetically latching solenoid which produces substantially equal holding forces in both positions may be referred to as a symmetrical magnetically latching solenoid, such as the solenoid described by Chase.

Figure 7:
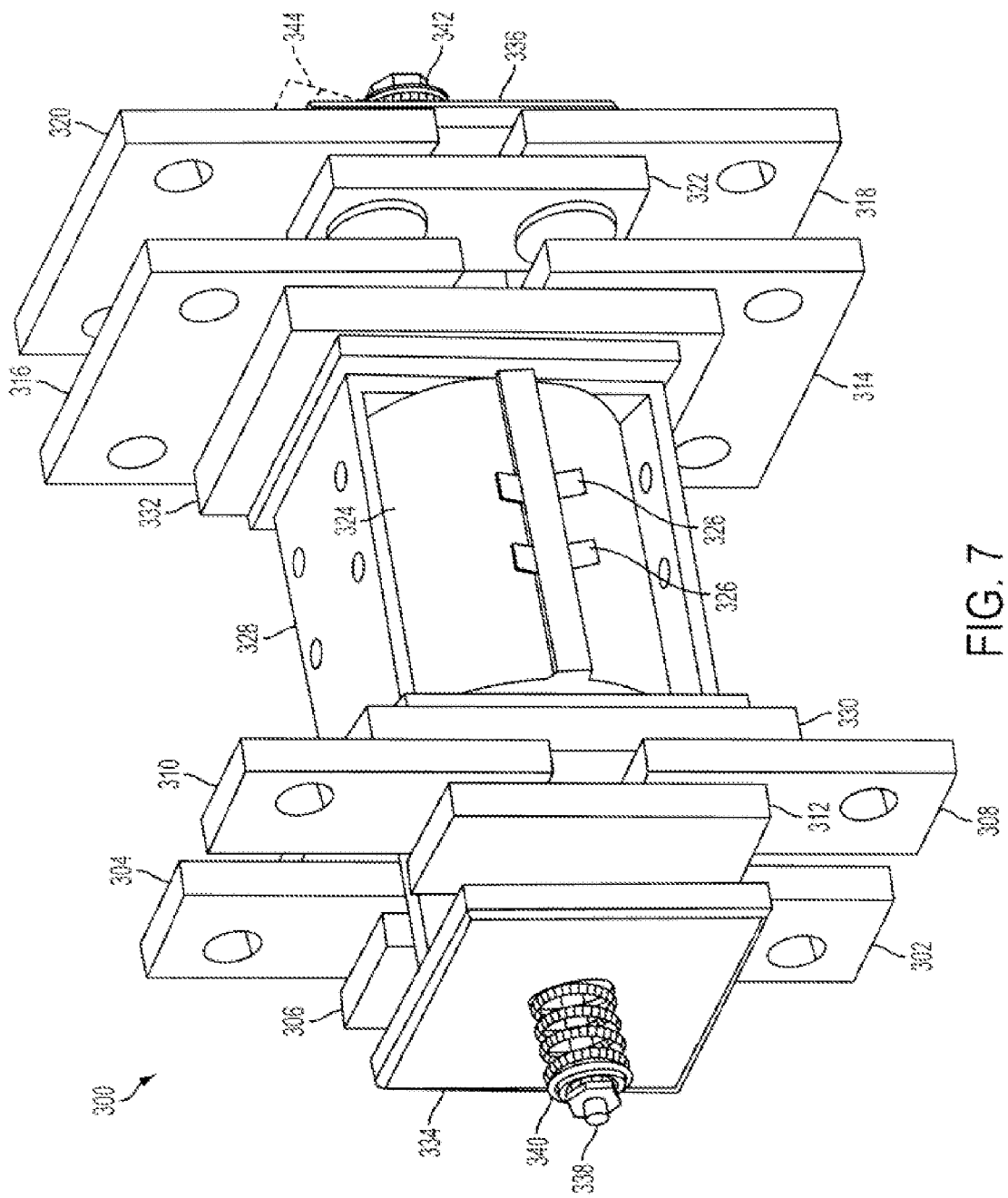
FIGS. 7-9 illustrate various embodiments of a bypass device.
Figure 8:
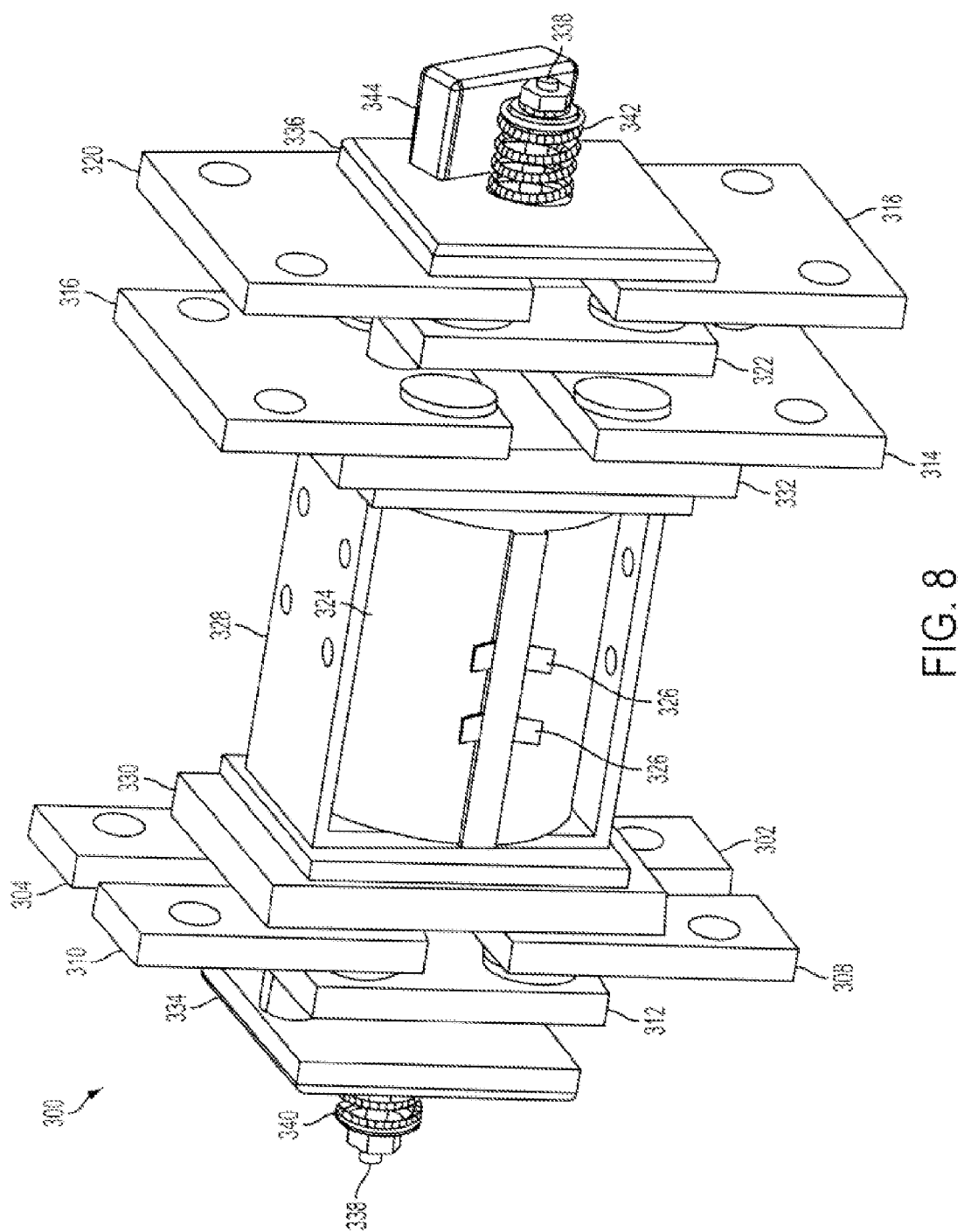
Figure 9:
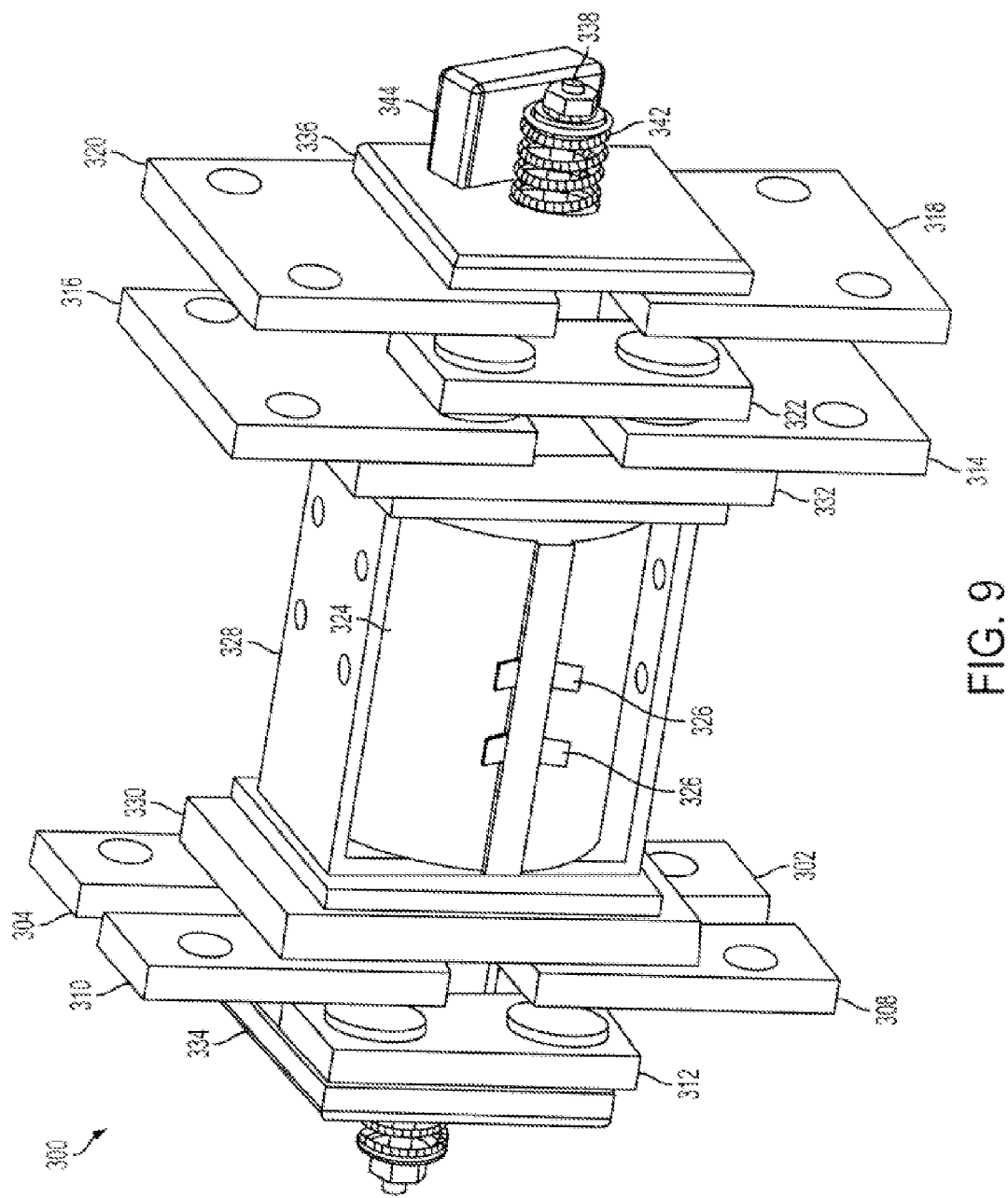

FIGS. 7-9 illustrate various embodiments of a full bypass device 300. The bypass device is a multi-pole contactor, and may be identical to or similar to the bypass device 272 of FIG. 6. The bypass device 300 includes a first contact which includes stationary portions 302, 304 and movable portion 306, a second contact which includes stationary portions 308, 310 and a movable portion 312, and a third contact which includes stationary portions 314, 316, 318, 320 and a movable portion 322. The bypass device 300 also includes a solenoid including a steel frame 328 and a coil 324 which controls the movable portions 306, 312, 322 of the first, second and third contacts. The stationary portions 304, 310 of the first and second contacts may be connected to any two of the input terminals A, B and C of a power cell. The stationary portions 314, 318 of the third contact may be respectively connected to the output terminals T1 and T2 of a power cell. The movable portions 306, 312, 322 of the first, second and third contacts are shown in the normal or non-bypass position in FIGS. 7 and 8, and are shown in the bypass position in FIG. 9. It should be noted that the bypass device 300 does not have any added insulation positioned between the solenoid coil 324 and the first, second and third contacts.

As shown in FIGS. 7-9, the solenoid of bypass device 300 also includes electrical terminals 326 connected to the single solenoid coil 324, a steel frame 328 which surrounds the solenoid coil 324, a first insulating plate 330 between the steel frame 328 and the stationary portions 304, 308, 310, 312 of the first and second contacts, a second insulating plate 332 between the steel frame 328 and the stationary portions 314, 316 of the third contact, and first and second support brackets 334, 336. The bypass device 300 further includes a non-magnetic shaft 338 which passes through the solenoid coil 324, through openings in the steel frame 328, through respective openings in first and second insulating plates 330, 332, and through respective openings of the first and second support brackets 334, 336.

Additionally, the bypass device 300 also includes a first biasing member 340 between the first support bracket 334 and a first end of the non-magnetic shaft 338, a second biasing member 342 between the second support bracket 336 and a second end of the non-magnetic shaft, and a position sensing device 344 which is configured to provide an indication of the position (bypass or non-bypass) of the movable portions 306, 312, 322 of the first, second and third contacts.

Although not shown for purposes of simplicity in FIGS. 7-9, one skilled in the art will appreciate that the bypass device 300 may further include a armature (e.g., a cylindrical steel armature) which can travel axially through an opening which extends from the first end of the coil 324 to the second end of the solenoid coil 324, permanent magnets capable of holding the movable portions of the contacts in either the bypass or the non-bypass position without current being applied to the solenoid coil 324, a first insulating bracket which carries the moving portions 306, 312 of the first and second contacts, a second insulating bracket which carries the moving portion 322 of the third contact, etc.

In operation, permanent magnets (not shown) hold the armature in either a first or a second position, which in turn holds the movable portions 306, 312, 322 of the contacts in either the non-bypass position or the bypass position. When the electrical terminals 326 receive pulses of current, the pulses of current are applied to the solenoid coil 324, thereby generating a magnetic field. Depending on the polarity of the applied pulse and the position of the armature, the applied pulse may or may not cause the armature to change its position. For example, according to various embodiments, if the armature is in the first position and the movable portions 306, 312, 322 of the contacts are in the non-bypass position, a positive current pulse will change the armature from the first position to the second position, which in turn changes the movable portions 306, 312, 322 of the contacts from the non-bypass position to the bypass position. In contrast, if a negative current pulse is applied, the armature will stay in the first position and the movable portions 306, 312, 322 of the contacts will stay in the non-bypass position.

Similarly, according to various embodiments, if the armature is in the second position and the movable portions 306, 312, 322 of the contacts are in the bypass position, a negative current pulse applied to the solenoid coil 324 will change the armature from the second position to the first position, which in turn changes the movable portions 306, 312, 322 of the contacts from the bypass position to the non-bypass position. In contrast, if a positive current pulse is applied to the solenoid coil 324, the armature will stay in the second position and the movable portions 306, 312, 322 of the contacts will stay in the bypass position.

It should be noted that the bypass device shown in FIGS. 7-9 is shown by way of example only. One skilled in the art may appreciate that alternative embodiments may be incorporated, for example, the bypass device 300 may use a magnetically latching solenoid having two separate coils.

Figure 10:
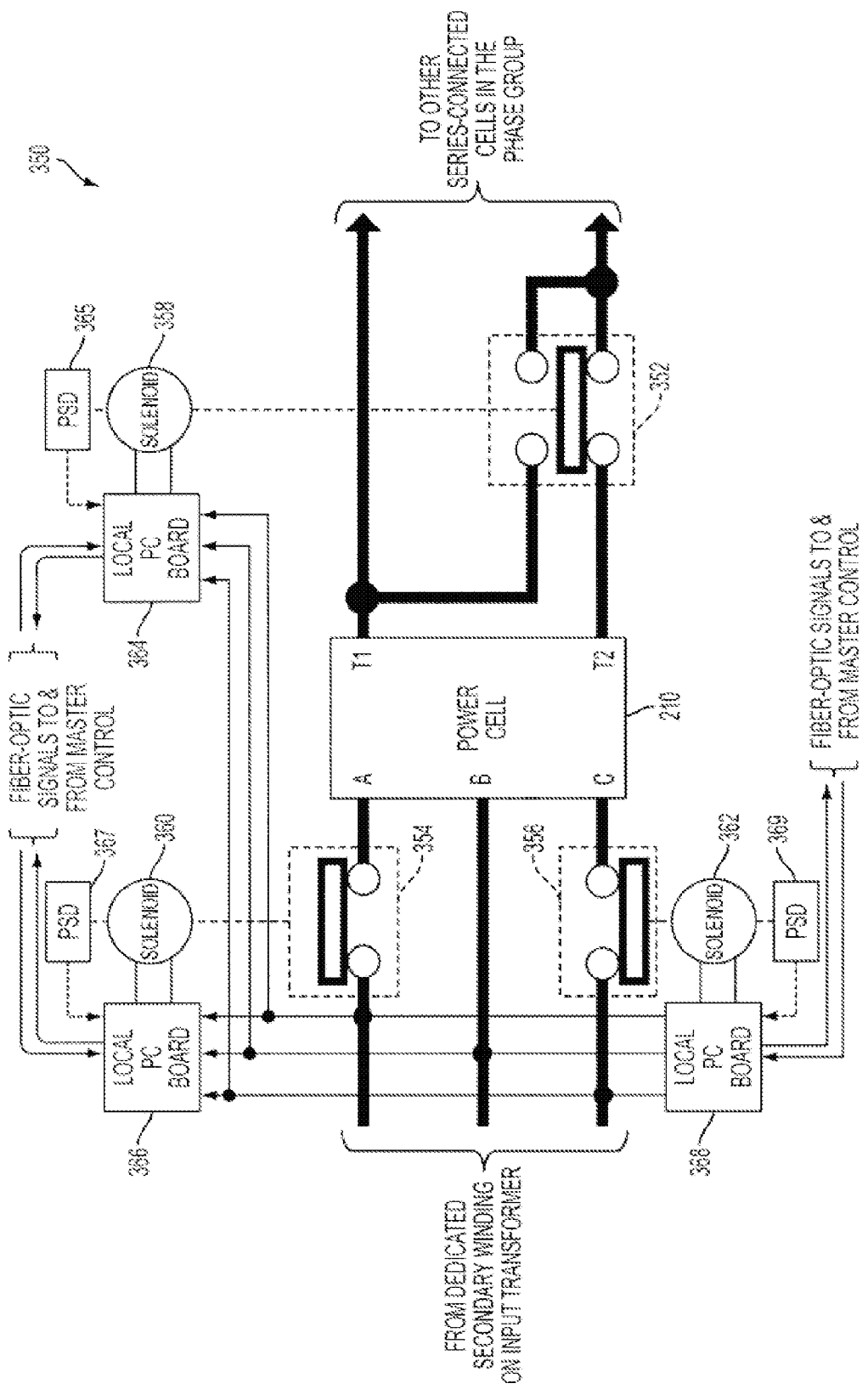
FIG. 10 illustrates various embodiments of a system for bypassing a power cell of a power supply.

FIG. 10 illustrates various embodiments of a system 350 for bypassing a power cell (e.g., power cell 210) of a power supply. The system 350 is similar to the system 250 of FIG. 5. The system 350 includes a first contact 352 connected to the output terminals T1 and T2 of the power cell, a second contact 354 connected to the input terminal A of the power cell, and a third contact 356 connected to the input terminal C of the power supply. Each of the contacts 352, 354, 356 include stationary portions and a movable portion. Although the second and third contacts 354, 356 are shown in FIG. 10 as being connected to input terminals A and C, it will be appreciated that, according to other embodiments, the second and third contacts 354, 356 may be connected to any two of the input terminals A, B and C.

The system 350 also includes a first solenoid 358 which controls the movable portions of the first contact 352, a second solenoid 360 which controls the movable portion of the second contact 354, and a third solenoid 362 which controls the movable portion of the third contact 356. According to various embodiments, the solenoids 358, 360, 362 are embodied as conventional solenoids. According to other embodiments, the solenoids 358, 360, 362 are embodied as magnetic latching solenoids which do not need to have continuous power applied to the coils in order to hold the armature in its first or second position and/or to hold the moving portions of the contacts 352, 354, 356 in the non-bypass or bypass position. The first contact 352 and the first solenoid 358 may collectively comprise a first contactor, the second contact 354 and the second solenoid 360 may collectively comprise a second contactor, and the third contact 356 and the third solenoid 362 may collectively comprise a third contactor.

Figure 1:
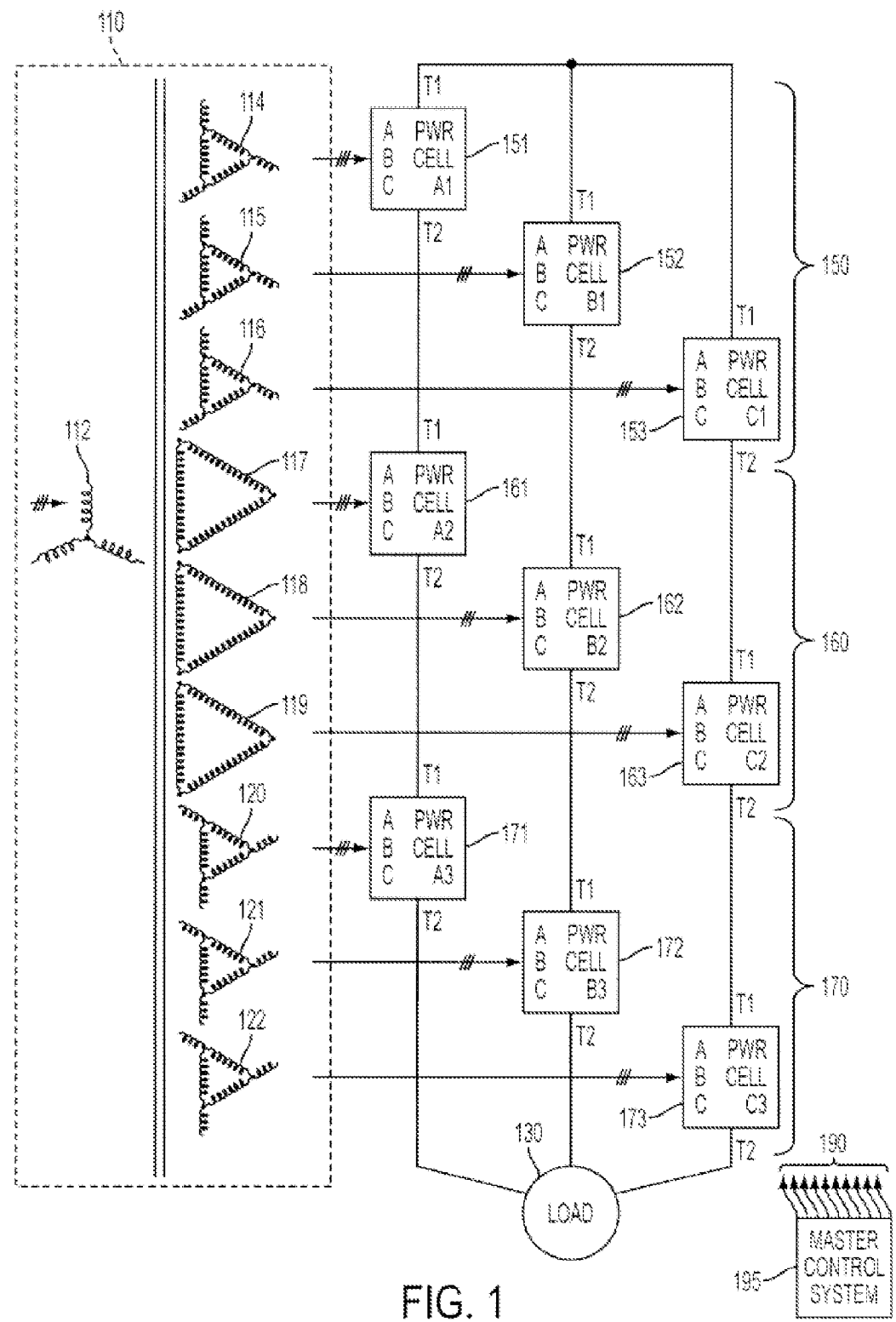
FIG. 1 illustrates various embodiments of a power supply.

The system 350 further includes a first local printed circuit board 364 in communication with a coil of the first solenoid 358, a second local printed circuit board 366 in communication with a coil of the second solenoid 360, and a third local printed circuit board 368 in communication with a coil of the third solenoid 362. Each of local printed circuit boards 364, 366, 368 are configured to control the respective movable portions of the contacts 352, 354, 356 via the respective coils of solenoids 358, 360, 362. In general, each of the local printed circuit boards 364, 366, 368 are configured to receive commands from, and report status to, a master control device (e.g., master control system 195 of FIG. 1). If the local printed circuit boards 364, 366, 368 operate at a different potential than the master control device, the communications to and from the master control device may be transmitted over fiber optics. Each of the local printed circuit boards 364, 366, 368 are also configured to deliver pulses of energy to the respective coils of solenoids 358, 360, 362 as needed to change the position of the movable portions of the respective contacts 352, 354, 356, and to recognize the position of the movable portions of the respective contacts 352, 354, 356. Each of the local printed circuit boards 364, 366, 368 may obtain control power from the input lines which are connected to input terminals A, B, C of the power cell. As shown in FIG. 10, one or more position sensing devices (labeled PSD in FIG. 10) may be utilized to provide the local printed circuit boards 364, 366, 368 with the respective positions of the movable portions of the contacts 352, 354, 356. According to various embodiments, the position sensing devices may be embodied as switching devices, hall effect sensors, optical sensors, etc.

For embodiments where the solenoids 358, 360, 362 are latching solenoids, the local printed circuit boards 364, 366, 368 may each include a DC capacitor which can store enough energy to switch the armature and/or the movable portions of the respective contacts 352, 354, 356 between positions. Each of the local printed circuit boards 364, 366, 368 may also include a power supply which restores the stored energy after a switching event, using AC power from the input lines connected to the input terminals A, B, C of the power cell.

Figure 11:
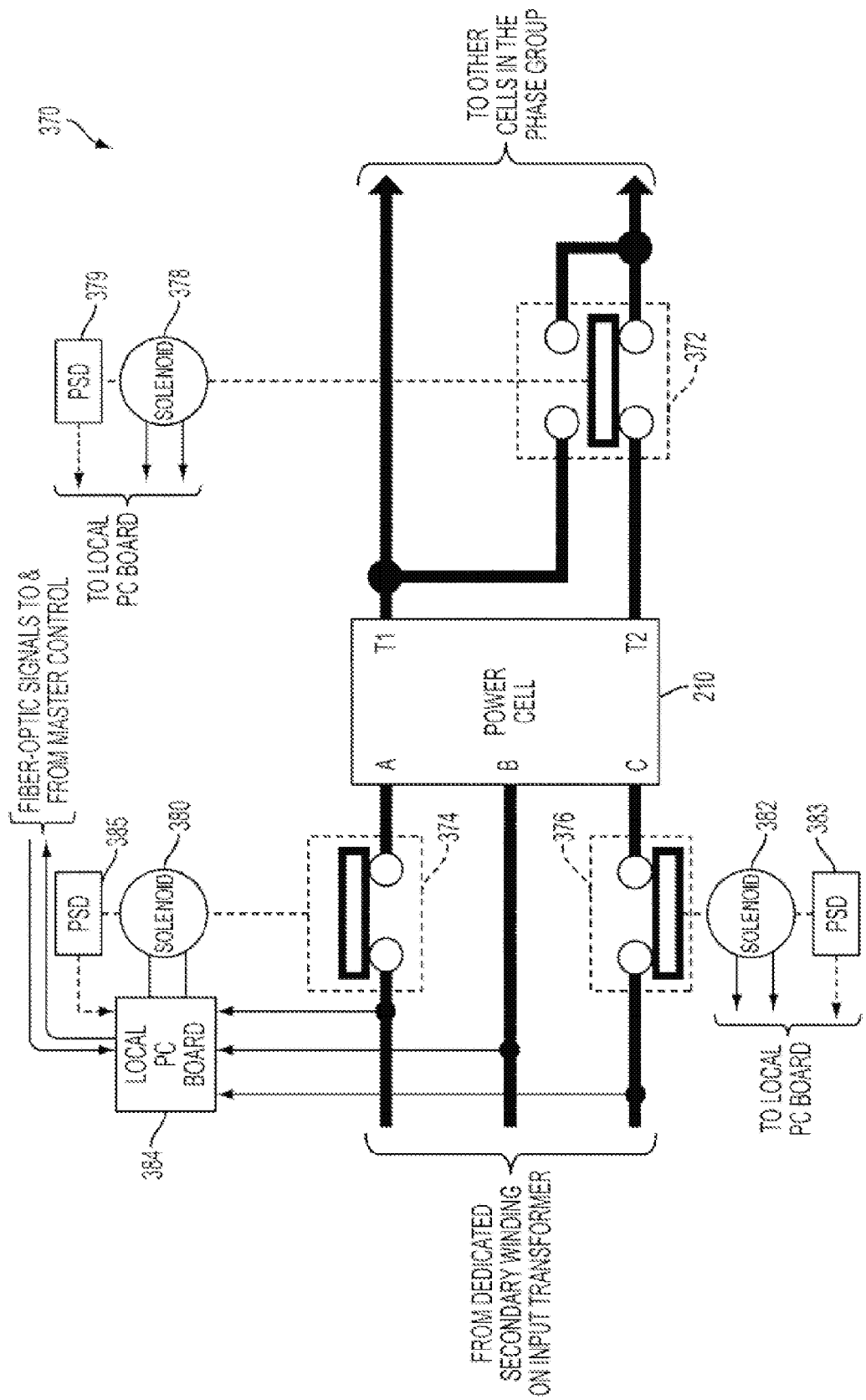
FIG. 11 illustrates various embodiments of a system for bypassing a power cell of a power supply.

FIG. 11 illustrates various embodiments of a system 370 for bypassing a power cell (e.g., power cell 210) of a power supply. The system 370 is similar to the system 350 of FIG. 10. The system 370 includes a first contact 372 connected to the output terminals T1 and T2 of the power cell, a second contact 374 connected to the input terminal A of the power cell, and a third contact 376 connected to the input terminal C of the power supply. Each of the contacts 372, 374, 376 include stationary portions and a movable portion. Although the second and third contacts 374, 376 are shown in FIG. 11 as being connected to input terminals A and C, it will be appreciated that, according to other embodiments, the second and third contacts 374, 376 may be connected to any two of the input terminals A, B and C.

The system 370 also includes a first solenoid 378 which controls the movable portions of the first contact 372, a second solenoid 380 which controls the movable portion of the second contact 374, and a third solenoid 382 which controls the movable portion of the third contact 376. According to various embodiments, the solenoids 378, 380, 372 are embodied as conventional solenoids. According to other embodiments, the solenoids 378, 380, 382 are embodied as magnetic latching solenoids which do not need to have continuous power applied to the coils in order to hold the armature in its first or second position and/or to hold the moving portions of the contacts 372, 374, 376 in the non-bypass or bypass position.

According to various embodiments, the first contact 372 and the first solenoid 378 are portions of a first bypass device, the second contact 374 and the second solenoid 380 are portions of a second bypass device, and the third contact 376 and the third solenoid 382 are portions of a third bypass device. For such embodiments, the system 370 includes a plurality of bypass devices.

In contrast to the system 350 of FIG. 10, the system 370 includes a single local printed circuit board 384 which is in communication with a coil of the first solenoid 378, a coil of the second solenoid 380, and a coil of the third solenoid 382. The local printed circuit board 384 is configured to control the respective movable portions of the contacts 372, 374, 376 via the respective coils of solenoids 378, 380, 382. Thus, the local printed circuit board 384 is similar to the local printed circuit boards described with respect to FIG. 10, but is different in that the local printed circuit board 384 is configured to drive three coils and recognize the respective positions of the movable portions of three contacts. In general, the local printed circuit board 384 is configured to receive commands from, and report status to, a master control device (e.g., master control system 195 of FIG. 1). If the local printed circuit board 384 operates at a different potential than the master control device, the communications to and from the master control device may be transmitted over fiber optics.

The local printed circuit board 384 is also configured to deliver pulses of energy to the coils 378, 380, 382 as needed to change the position of the movable portions of the respective contacts 372, 374, 376, and to detect the position of the movable portions of the respective contacts 372, 374, 376. The local printed circuit board 384 may obtain control power from the input lines which are connected to input terminals A, B, C of the power cell. As shown in FIG. 11, one or more position sensing devices (labeled PSD in FIG. 11) may be utilized to provide the local printed circuit board 384 with the respective positions of the movable portions of the contacts 372, 374, 376. According to various embodiments, the position sensing devices may be embodied as switching devices, hall effect sensors, optical sensors, etc. The PSD is discussed in greater detail in the discussions of FIGS. 16A, 16B and 16C below.

For embodiments where the solenoids 378, 380, 382 are latching solenoids, the local printed circuit board 384 may include a DC capacitor which can store enough energy to switch the armature and/or the movable portions of the contacts 352, 354, 356 between positions. The local printed circuit board 384 may also include a power supply which restores the stored energy after a switching event, using AC power from the input lines connected to the input terminals A, B, C of the power cell.

Figure 12:
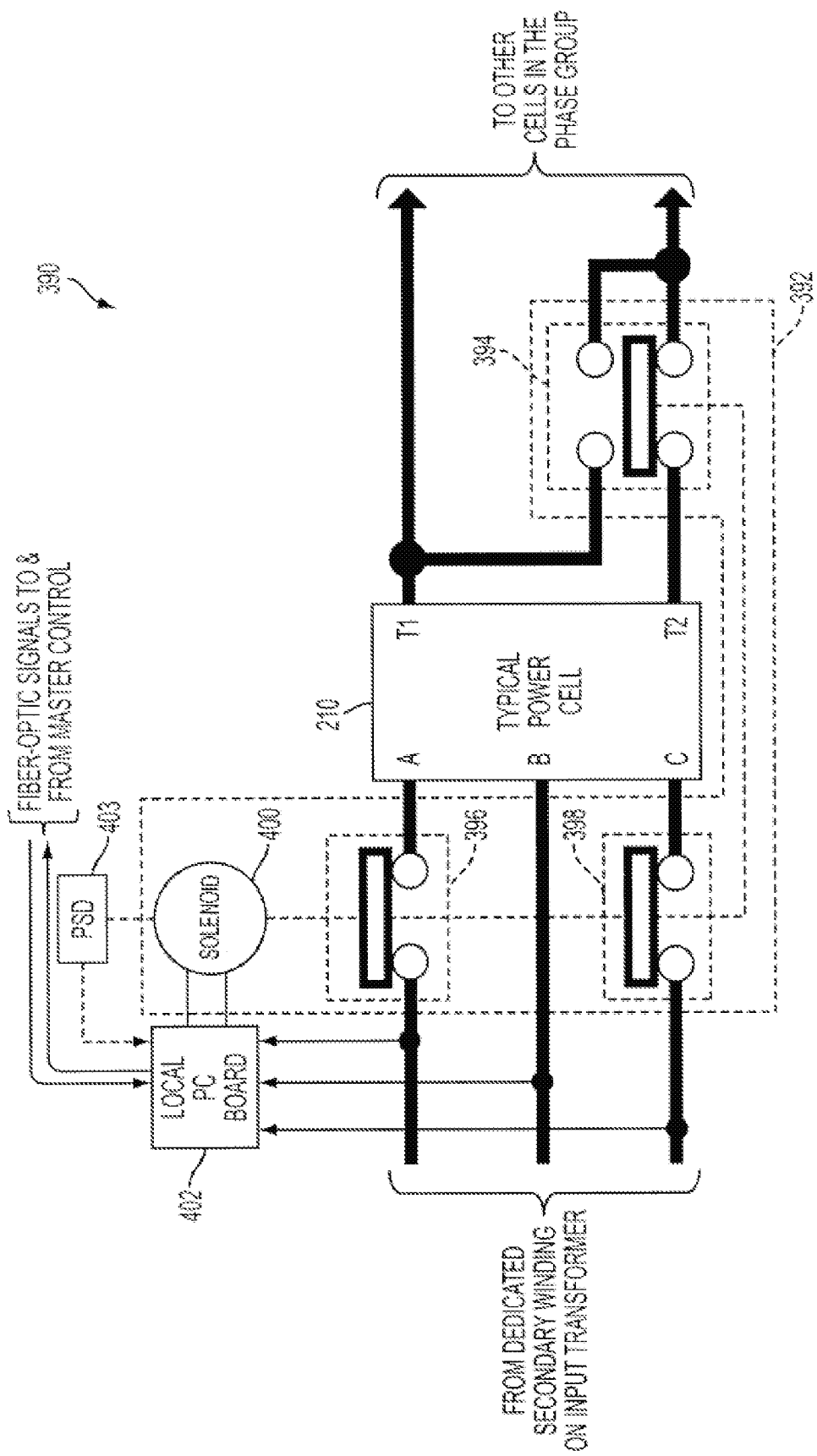
FIG. 12 illustrates various embodiments of a system for bypassing a power cell of a power supply.

FIG. 12 illustrates various embodiments of a system 390 for bypassing a power cell (e.g., power cell 210) of a power supply. The system 390 is similar to the system 370 of FIG. 11. The system 390 includes a bypass device 392 which may be embodied as a multi-pole contactor. The bypass device 392 may be identical to or similar to the bypass device 300 shown in FIGS. 7-9. The bypass device 392 includes a first contact 394 connected to the output terminals T1 and T2 of the power cell, a second contact 396 connected to the input terminal A of the power cell, and a third contact 398 connected to the input terminal C of the power supply. Each of the contacts 394, 396, 398 include stationary portions and a movable portion. Although the second and third contacts 396, 398 are shown in FIG. 12 as being connected to input terminals A and C, it will be appreciated that, according to other embodiments, the second and third contacts 396, 398 may be connected to any two of the input terminals A, B and C.

In contrast to system 370 of FIG. 11, the system 390 includes a single solenoid 400 which controls the movable portions of the first, second and third contacts 394, 396, 398. According to various embodiments, the solenoid 400 is embodied as a conventional, or non-latching solenoid. According to other embodiments, the solenoid 400 is embodied as a magnetic latching solenoid which does not need to have continuous power applied to the coil in order to hold the armature in its first or second position and/or to hold the moving portions of the contacts 394, 396, 398 in the non-bypass or bypass position.

The system 390 also includes a single local printed circuit board 402 which is in communication with the solenoid 400. The local printed circuit board 402 is configured to control the respective movable portions of the contacts 394, 396, 398 via a coil of solenoid 400. In general, the local printed circuit board 402 is configured to receive commands from, and report status to, a master control device (e.g., master control system 195 of FIG. 1). If the local printed circuit board 402 operates at a different potential than the master control device, the communications to and from the master control device may be transmitted over fiber optics.

The local printed circuit board 402 is also configured to deliver pulses of energy to the coil of solenoid 400 as needed to change the position of the movable portions of the respective contacts 394, 396, 398, and to recognize the position of the movable portions of the respective contacts 394, 396, 398. The local printed circuit board 402 may obtain control power from the input lines which are connected to input terminals A, B, C of the power cell. As shown in FIG. 12, a position sensing device (labeled PSD in FIG. 12) may be utilized to provide the local printed circuit board 402 with the respective positions of the movable portions of the contacts 394, 396, 398. According to various embodiments, the position sensing device may be embodied as a switching device, a hall effect sensor, an optical sensor, a reed switch, etc. The position sensing device is discussed in greater detail in the discussion of FIGS. 15A and 15B below.

For embodiments where the solenoid 400 is a latching solenoid, the local printed circuit board 402 may also include a DC capacitor which can store enough energy to switch the armature and/or the movable portions of the contacts 394, 396, 398 between positions. The local printed circuit board 402 may also include a power supply which restores the stored energy after a switching event, using AC power from the input lines connected to the input terminals A, B, C of the power cell.

One skilled in the art may appreciate that the bypass devices as shown in FIGS. 10, 11 and 12 are shown by way of example, and may be implemented in additional manners. For example, each bypass device may incorporate a magnetically latching solenoid having two separate coils.

The exemplary arrangements as shown in FIGS. 10, 11 and 12 may allow the solenoid to operate near the same potential as the contacts. As such, no added insulation between the solenoid and the contacts may be necessary. These arrangements may be suitable for use with the exemplary contactors as shown in FIGS. 7, 8 and 9. Other arrangements may operate the solenoid at a potential differing from that of the contacts, and may require added insulation as referenced in the following discussion of FIGS. 13A and 13B.

Figure 13A:
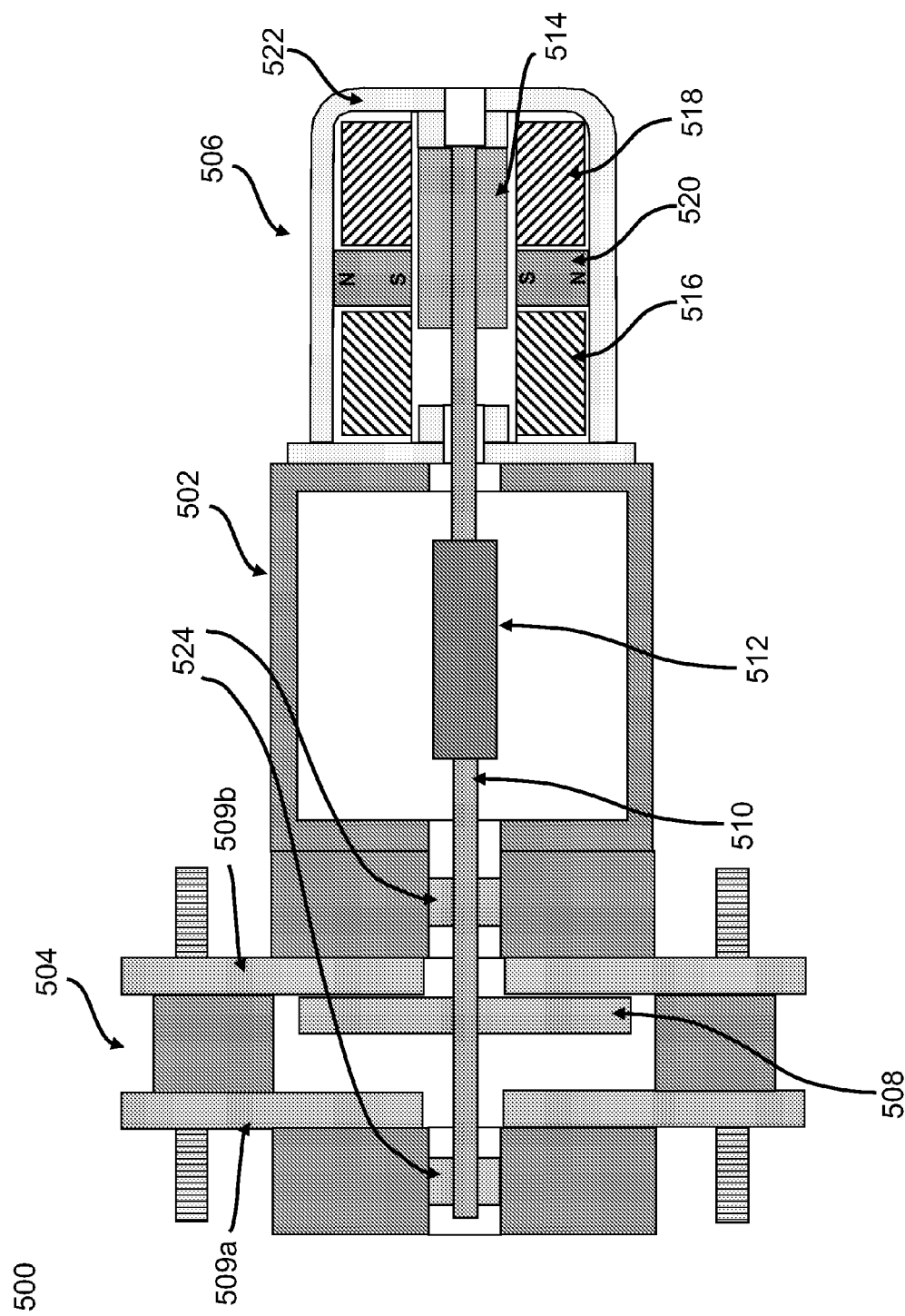
FIGS. 13A and 13B illustrate various embodiments of a bypass device incorporating added insulation.
Figure 13B:
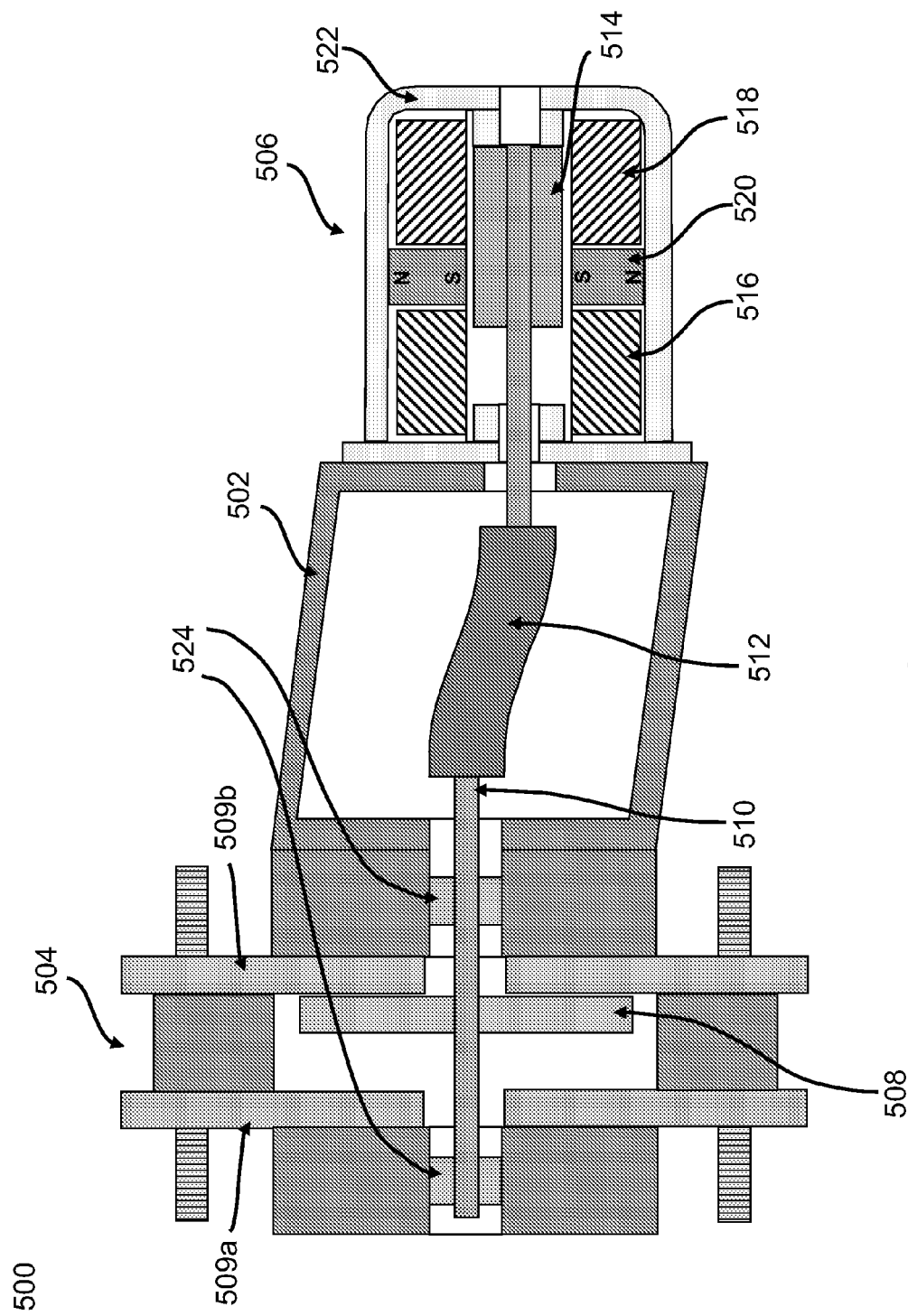

FIGS. 13A and 13B illustrate alternative embodiments for an exemplary bypass device. As shown in FIG. 13A, a bypass device 500 may include added insulation 502 and 512 positioned between a first contact 504 and a solenoid 506. Similar to the contacts discussed above, first contact 504 may include a movable portion 508 configured to move between a first stationary portion 509a and a second stationary portion 509b, depending on the position of the solenoid 506. The movable portion 508 may be operably connected to the solenoid via a shaft 510 by means of an insulating portion 512. To provide added flexibility, the insulating portion 512 may be made flexible. In alternative embodiments, the entire shaft 510 may be constructed from a flexible material such as plastic. Similarly, in alternative embodiments, the insulating portion 512 may incorporate one or more joints such as a plastic ball-joint or a universal joint, thereby providing some movement or flexibility to the shaft.

The added insulation 502 and 512 may be positioned such that a gap is created and defined between the first contact 504 and the solenoid 506. This gap provides additional clearance between the first contact 504 and the solenoid 506. This additional clearance may provide an operating environment where the first contact 504 may function at medium voltage levels while the solenoid 506 operates at or near ground potential. Thus, the solenoid 506 may be protected from any arc-over produced by the medium voltage at the first contact 504.

As discussed above, the solenoid 506 may be a symmetrical magnetically latching solenoid. The solenoid may receive the shaft 510 and include a movable steel (or other magnetic material) armature 514 about the shaft 510. By applying a current to a first coil 516 or a second coil 518, the movable steel armature 514 may be shifted from a first position to a second position, or from a second position to a first position. A permanent magnetic 520 may hold the movable steel armature 514 in either the first or second position when neither the first coil 516 nor the second coil 518 is energized. As the movable steel armature 514 is moved, the shaft 510 may also move, thereby moving the movable portion 508 of the first contact 504 by means of the insulating portion 512. The various components of the solenoid 506 may be enclosed by a rigid frame 522 constructed or otherwise manufactured from a magnetic material such as steel. The rigid frame 522 may serve to confine the magnetic field, and to protect various components of the solenoid 506.

As discussed above, the added insulation 502 and 512 is positioned between the first contact 504 and the solenoid 506. Preferably, the added insulation 502 is constructed from a rigid, non-conducting material such as plastic, fiberglass, ceramic, etc. However, depending on the installation and positioning of the bypass device 500, added mechanical stress may be applied to the bypass device, causing distortion of the various components. As shown in FIG. 13B, the added insulation 502 may flex or distort as a result of these added stresses. However, the flexible insulating portion 512 of the shaft 510 may flex accordingly, thereby resulting in the shaft still being able to move freely between the first contact 504 and the solenoid 506. Various guide bushings 524 may be included to ensure that the shaft 510 remains positioned such that the movable portion 508 of the first contact 504 continues to function normally.

The exemplary arrangement of components as shown in FIGS. 13A and 13B may allow the solenoids and any associated control circuitry to operate at a potential substantially different from the first contact 504, resulting from the added insulation 502 and 512. Alternatively, the added insulation 502 and 512 may be eliminated as shown in FIGS. 14-15 and explained in the following discussion. If the contactor does not have added insulation 502 and 512 allowing the solenoid and associated control circuitry to operate at a potential substantially different from the contacts 504, then an alternative may be to operate the solenoid near the potential of the contacts, and to insulate the control circuits so that they can also operate near this potential. This may require that the control circuits receive power at a potential near that of the contacts, such as from the power cell inputs. It may also require that the communications pate between the local control circuits and the master control be isolated, such as by fiber optics. For example, the bypass configurations shown in FIGS. 14B and 15B, as discussed below, may be suitable for use with the exemplary contacts as shown in FIGS. 7-9.

Figure 14A:
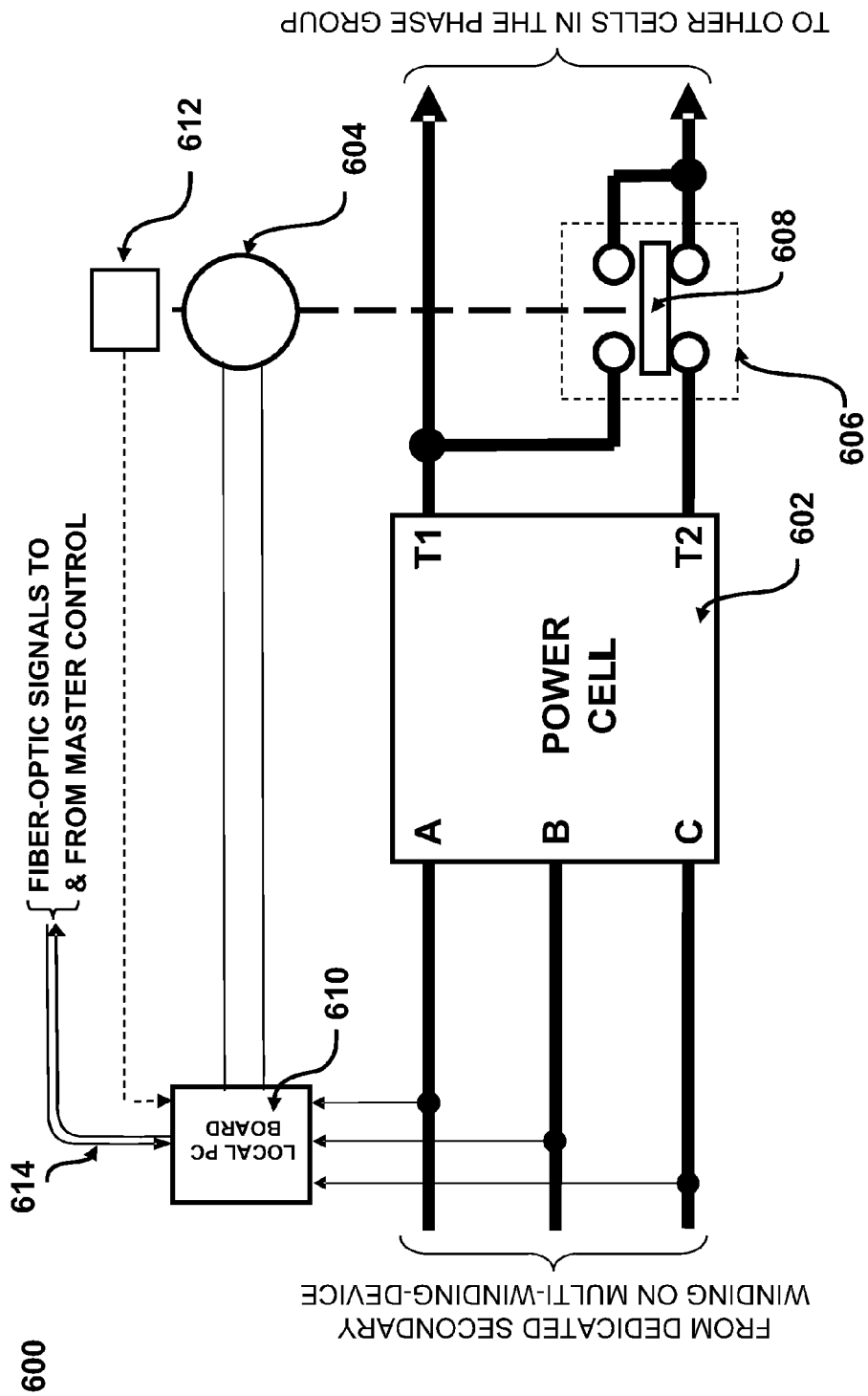
FIGS. 14A and 14B illustrates various embodiments of a system for bypassing a power cell of a power supply.
Figure 14B:
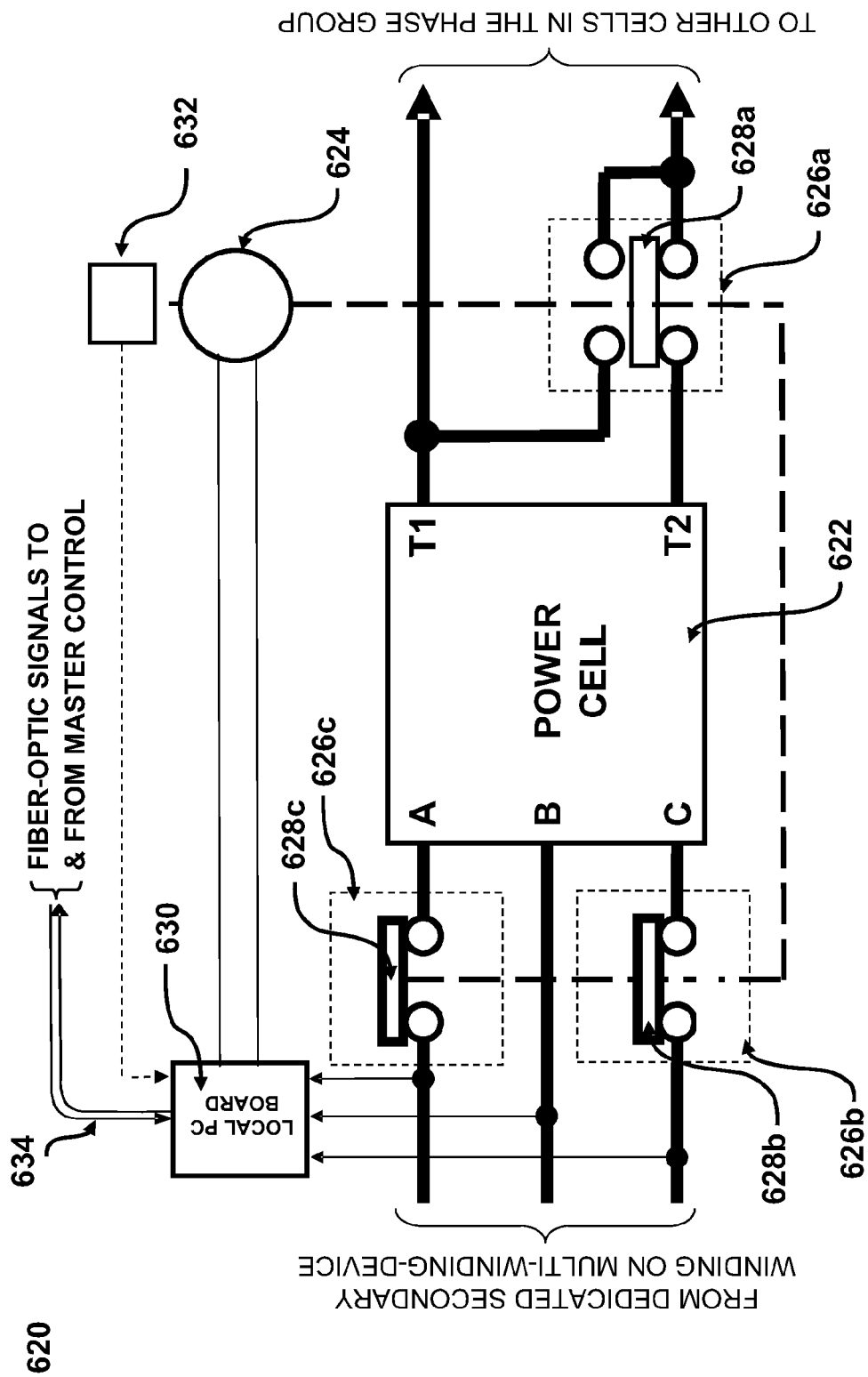

FIGS. 14A and 14B illustrate exemplary circuits 600 and 620 respectively. The circuit 600 includes a standard or partial bypass device, similar to the bypass device 500 discussed in regard to FIG. 13A, used to bypass the output of power cell 602. A latching solenoid 604, such as magnetically latching solenoid 506, may be operably connected to a movable portion 608 of a first contact 606. The latching solenoid may also be operably connected to a local printed circuit (PC) board 610. The local PC board 610 may obtain control power directly from the input lines to the power cell 602. In this example, no added insulation may be required between the solenoid 604 and the first contact 606 as the local PC board and the solenoid are operating at a similar voltage and electrical potential as the power cell 602. The local PC board 610 may receive a signal from a master control via fiber optics 614, the signal indicating the output of the power cell 602 is to be bypassed. The local PC board 610 may communicate a signal to the solenoid 604 instructing the solenoid 604 to bypass the output of the power cell 602. In response, the solenoid 604 may move from a first position to a second position (or, conversely, from a second position to a first position), thereby moving movable portion 608 and bypassing the output of power cell 602.

The circuit 600 may also include a position sensing device (PSD) 612. The PSD 612 may be operably connected to the local PC board 610 and transmit a signal to the local PC board indicating the position of the solenoid 604, i.e., is the solenoid in the first or second position. The local PC board 610 may then further transmit the position information to a master control via the fiber optics 614.

The circuit 600 may avoid the need for added insulation (e.g., added insulation 502 and 512) by providing control power to local PC board 610 at or near the potential of contacts 606 as well as by providing an isolating medium for the control signals such as the fiber optics 614.

The circuit 620 is similar to circuit 600 with the exception that it includes a full bypass device used to bypass both the inputs and the output of a power cell 622. A latching solenoid 624, such as magnetically latching solenoid 506, may be operably connected to a first movable portion 628a of a first contact 626a, a second movable portion 628b of a second contact 626b, and a third movable portion 628c of a third contact 626c. The latching solenoid may also be operably connected to a local PC board 630. The local PC board 630 may receive a signal from a master control via fiber optics 634, the signal indicating the power cell 622 is to be bypassed. The local PC board 630 may transmit a signal to the solenoid 624 instructing the solenoid to bypass the power cell 622. In response, the solenoid 624 may move from a first position to a second position (or, conversely, from a second position to a first position), thereby moving movable portions 628a, 628b and 628c, thereby bypassing the inputs and the output of power cell 622.

Similar to circuit 600, the circuit 620 may also include a PSD 622. The PSD 622 may be operably connected to the local PC board 630 and transmit a signal to the local PC board indicating the position of the solenoid 624, i.e., is the solenoid in the first or second position. The local PC board 630 may then further transmit the position information to a master control via the fiber optics 634.

The circuit 620 may avoid the need for added insulation (e.g., added insulation 502 and 512) by providing control power to local PC board 630 at or near the potential of contacts 626 as well as by providing an isolating medium for the control signals such as the fiber optics 634.

Depending on the installation and application of the full bypass device used in circuit 620, the second contact 626*b* and the third contact 626*c* (i.e., the input bypass contacts) may be implemented as one of various types of contacts. One possibility may be to use conventional contacts in air without arc chutes. As another possibility, an arc chute may be implemented into the second contact 626*b* and/or the third contact 626*c*. As yet another possibility, vacuum contacts may be used for the second contact 626*b* and the third contact 626*c*. The vacuum contacts may be operably connected to solenoid 624 and controlled by the local PC board 630. In response to a signal from the local PC board to bypass the input associated with the vacuum contact, the vacuum contacts may open, thereby bypassing the input of the power cell 622.

Figure 15A:
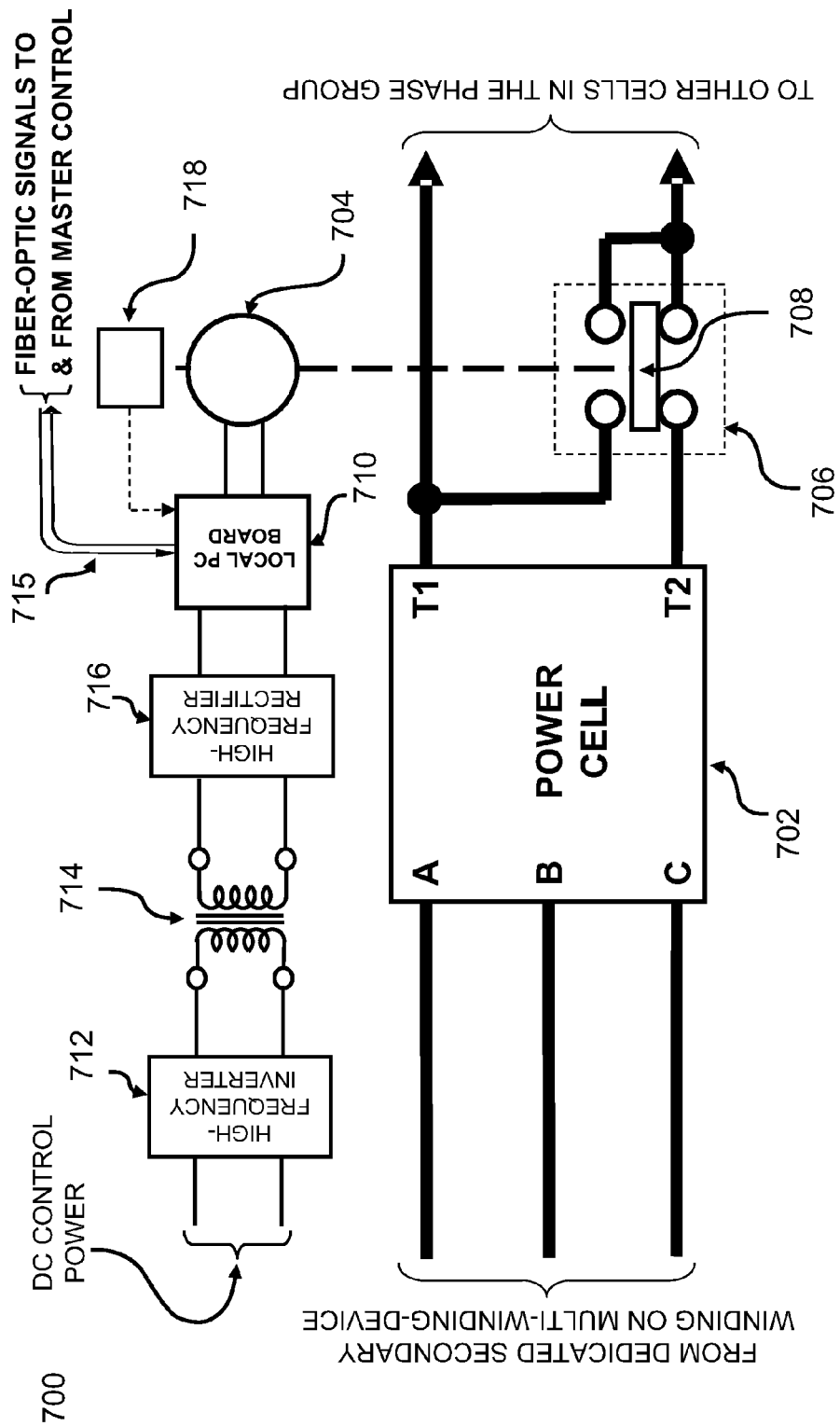
FIGS. 15A and 15B illustrates various embodiments of a system for bypassing a power cell of a power supply.
Figure 15B:
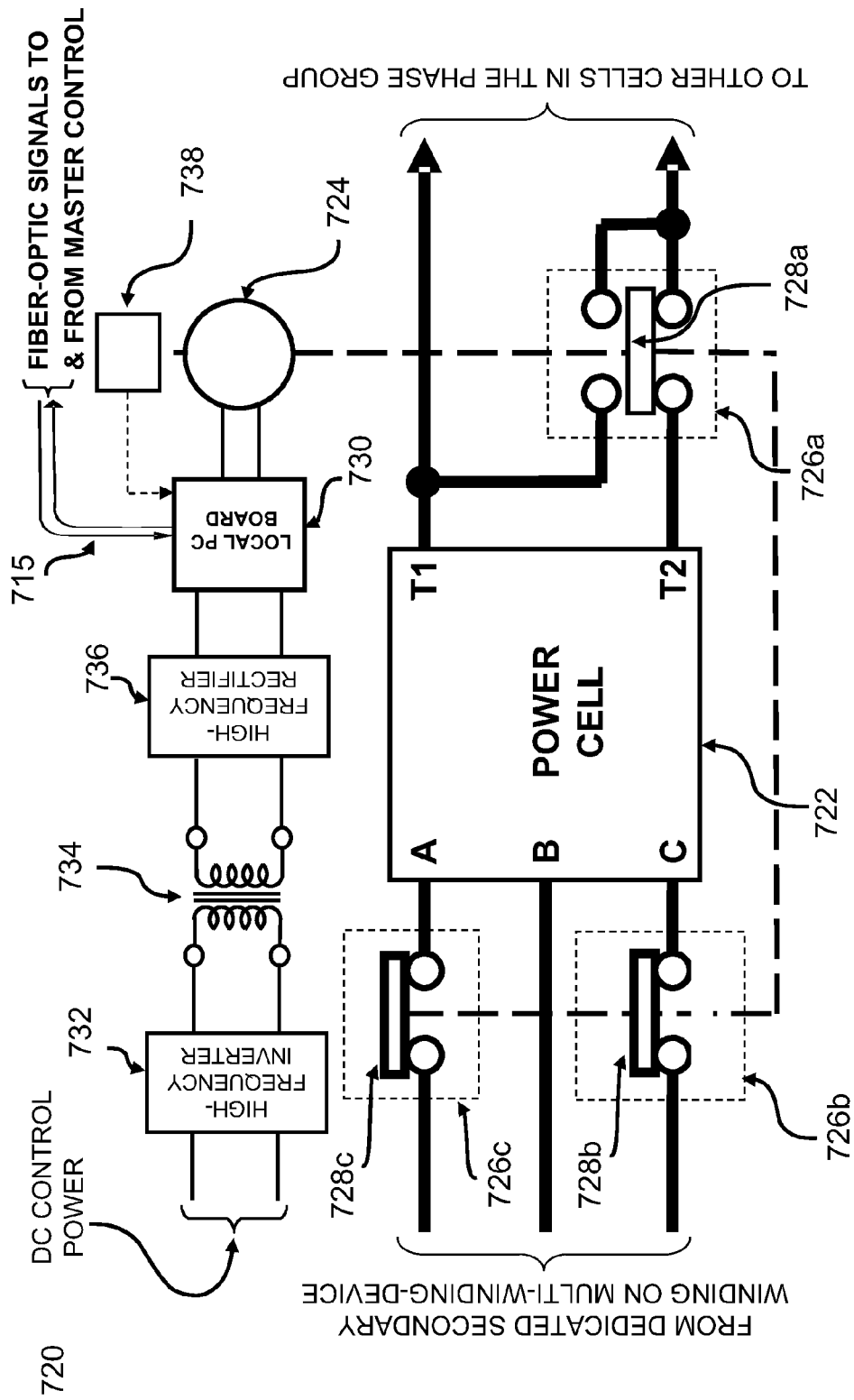

FIGS. 15A and 15B illustrate additional exemplary circuits that may avoid any added insulation such as added insulation 502 and 512 as shown in FIGS. 13A and 13B. Similar to FIGS. 14A and 14B, exemplary circuits 700 and 720 illustrate a partial and full bypass respectively. However, circuits 700 and 720 incorporate different means of providing control power to a local PC board at or near the potential of the contacts.

The circuit 700 includes a standard or partial bypass device without added insulation 502 and 512, similar to the bypass device 300 discussed in regard to FIGS. 7-9, but with single pole double throw contacts only, used to bypass the output of power cell 702. A latching solenoid 704, such as magnetically latching solenoid 506, may be operably connected to a movable portion 708 of a first contact 706. The latching solenoid may also be operably connected to a local PC board 710. The local PC board 710 may obtain control power near or at the potential of the contact 706 from a common voltage power supply at or near ground potential. A series of components may be used to isolate the local PC board 710 from the common voltage power supply. The control power may first be inverted from DC power to AC power by a high-frequency inverter 712. Once the control power has been inverted, a high-frequency transformer 714 may isolate the AC power such that any differences in electrical potential between the local PC board 710 and the common voltage power supply may be tolerated. In order to provide an acceptable level of isolation, the high-frequency transformer 714 may include extra insulation. Once the control power has been isolated by the high-frequency transformer 714, a high-frequency rectifier 716 may convert the control power from AC to DC, and supply the control power to the local PC board 710. In this example, no added insulation such as added insulation 502 is included between the solenoid 704 and the contact 706. As before, the local PC board 710 may receive a signal from a master control via fiber optics 715, the signal indicating the output of the power cell 702 is to be bypassed. The local PC board 710 may communicate a signal to the solenoid 704 instructing the solenoid 704 to bypass the output of the power cell 702. In response, the solenoid 704 may move from a first position to a second position (or, conversely, from a second position to a first position), thereby moving movable portion 708 and bypassing the output of power cell 702.

The circuit 700 may also include a PSD 718. The PSD 718 may be operably connected to the local PC board 710 and transmit a signal to the local PC board indicating the position of the solenoid 704, i.e., is the solenoid in the first or second position. The local PC board 710 may then further transmit the position information to a master control via the fiber optics 715.

The circuit 700 may avoid the need for added insulation (e.g., added insulation 502 and 512) by providing control power to local PC board 710 at or near the potential of contact 706 as well as providing an isolating medium for the control signals such as the fiber optics 715.

The circuit 720 is similar to circuit 700 with the exception that it includes a full bypass device used to bypass both the inputs and the output of a power cell 722. A latching solenoid 724, such as magnetically latching solenoid 506, may be operably connected to a first movable portion 728*a* of a first contact 726*a*, a second movable portion 728*b* of a second contact 726*b*, and a third movable portion 728*c* of a third contact 726*c*. The latching solenoid may also be operably connected to a local PC board 730. The local PC board 730 may obtain control power near or at the potential of contacts 726*a*, 726*b* and 726*c* from a common voltage power supply at or near ground potential via. A series of components may be used to isolate the local PC board 730 from the common voltage power supply. The control power may first be inverted from DC power to AC power by a high-frequency inverter 732. Once the control power has been inverted, a high-frequency transformer 734 may isolate the AC power such that any differences in potential between the local PC board 730 and the common voltage power supply may be tolerated. Once the control power has been isolated by the high-frequency transformer 734, a high-frequency rectifier 736 may convert the control power from AC to DC, and supply the control power to the local PC board 730. In this example, no added insulation such as added insulation 502 is included between the solenoid 724 and the contacts 726*a*, 726*b* and 726*c*. The local PC board 730 may receive a signal from a master control via fiber optics 735, the signal indicating the power cell 722 is to be bypassed. The local PC board 730 may transmit a signal to the solenoid 724 instructing the solenoid to bypass the power cell 722. In response, the solenoid 724 may move from a first position to a second position (or, conversely, from a second position to a first position), thereby moving movable portions 728*a*, 728*b* and 728*c*, thereby bypassing the inputs and the output of power cell 722.

Similar to circuit 700, the circuit 720 may also include a PSD 738. The PSD 738 may be operably connected to the local PC board 730 and transmit a signal to the local PC board indicating the position of the solenoid 724, i.e., is the solenoid in the first or second position. The local PC board 730 may then further transmit the position information to a master control via the fiber optics 735.

The circuit 720 may avoid the need for added insulation (e.g., added insulation 502) by providing control power to local PC board 730 at or near the potential of contacts 726*a*, 726*b* and 726*c* as well as providing an isolating medium for the control signals such as the fiber optics 735.

Depending on the installation and application of the full bypass device used in circuit 720, the second contact 726*b* and the third contact 726*c* (i.e., the input bypass contacts) may be implemented as one of various types of contacts. One possibility is to use conventional contacts in air without arc chutes. As another possibility, an arc chute may be implemented into the second contact 726*b* and/or the third contact 726*c*. As yet another possibility, vacuum contacts may be used for the second contact 726*b* and the third contact 726*c*.

The vacuum contacts may be operably connected to the solenoid 724 and controlled by the local PC board 730. In response to a signal from the local PC board to bypass the input associated with the vacuum contacts, the vacuum contacts may open, thereby bypassing the input of the power cell 722.

Figure 16A:
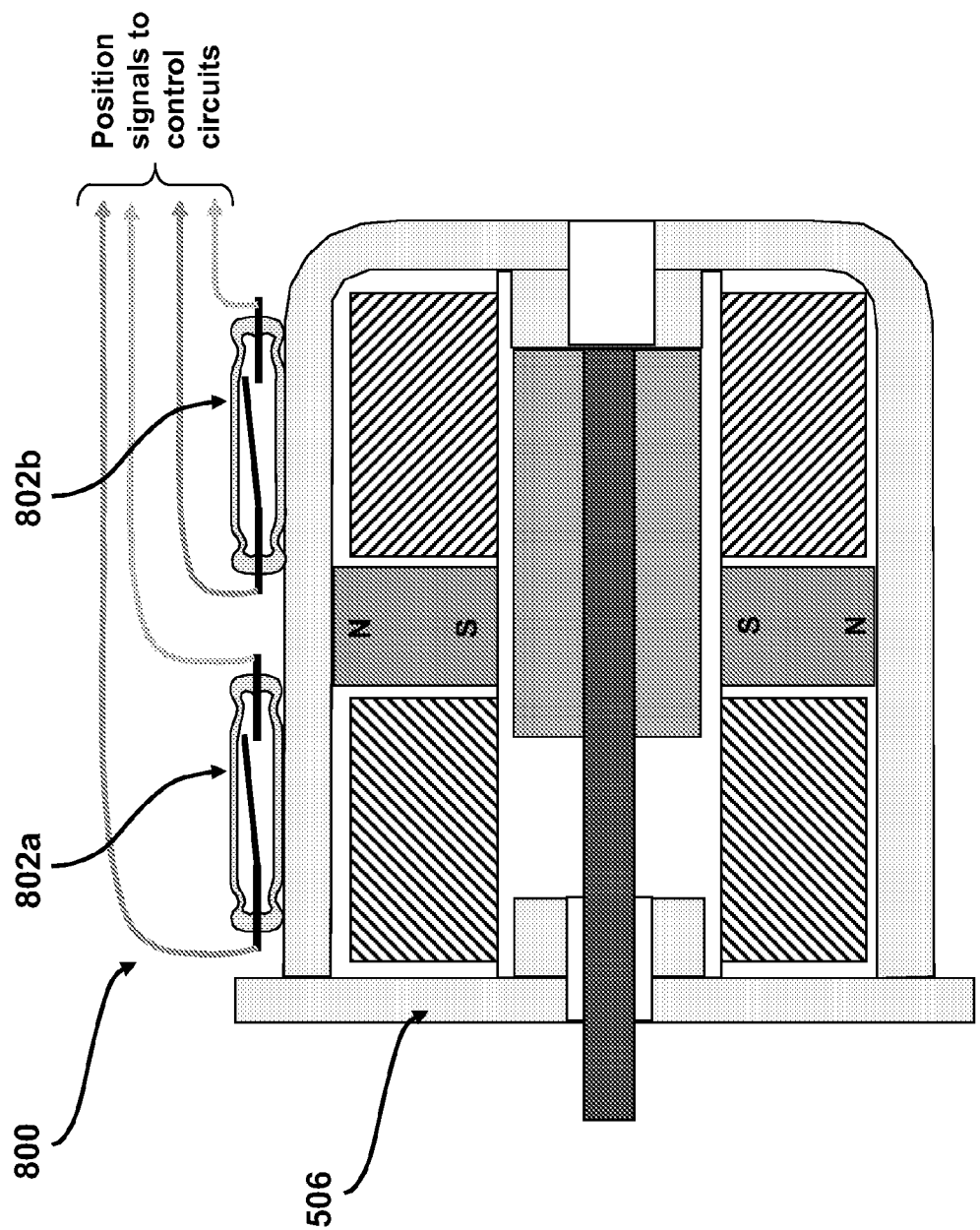
FIGS. 16A, 16B and 16C illustrate various embodiments of a position sensing device.
Figure 16B:
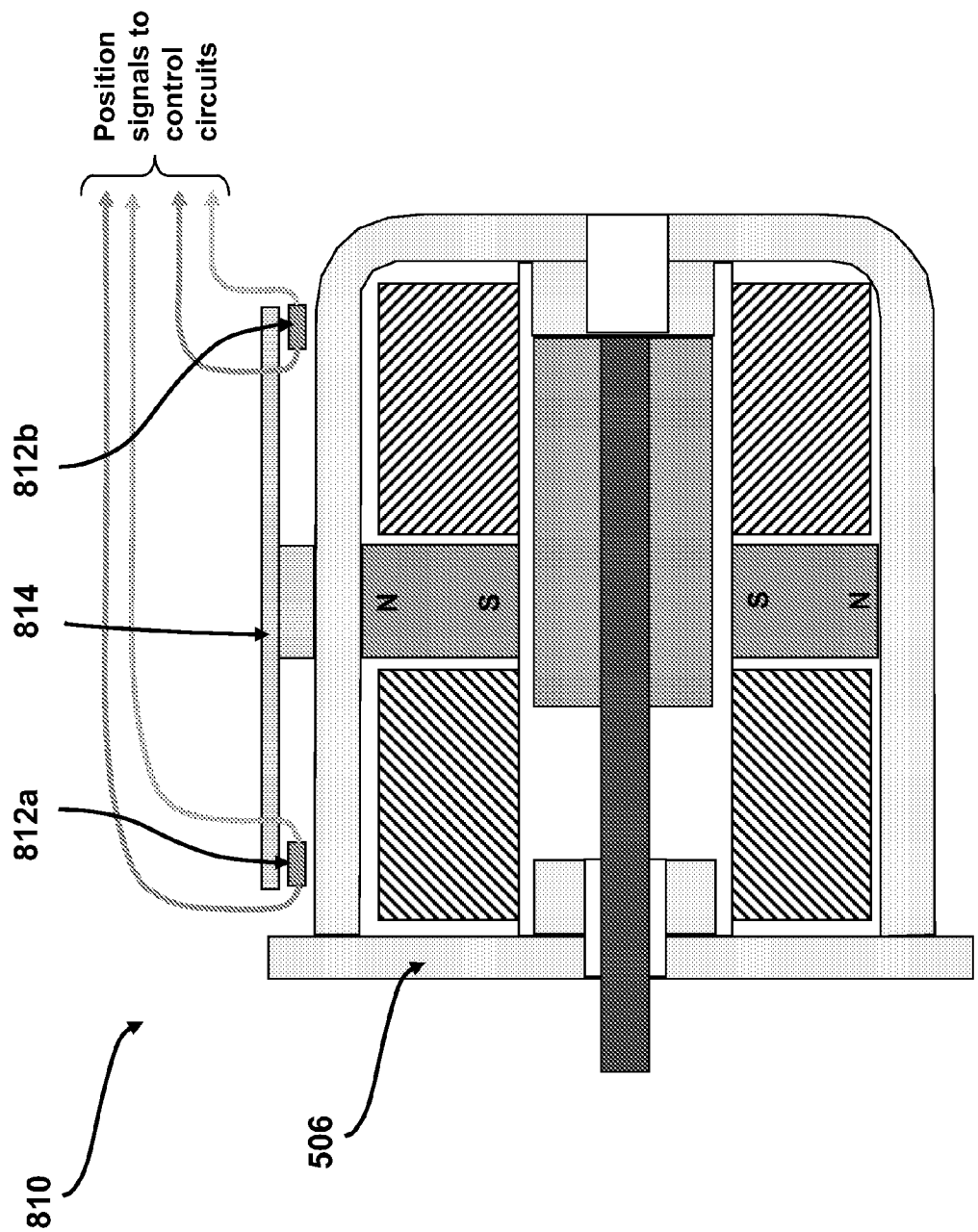
Figure 16C:
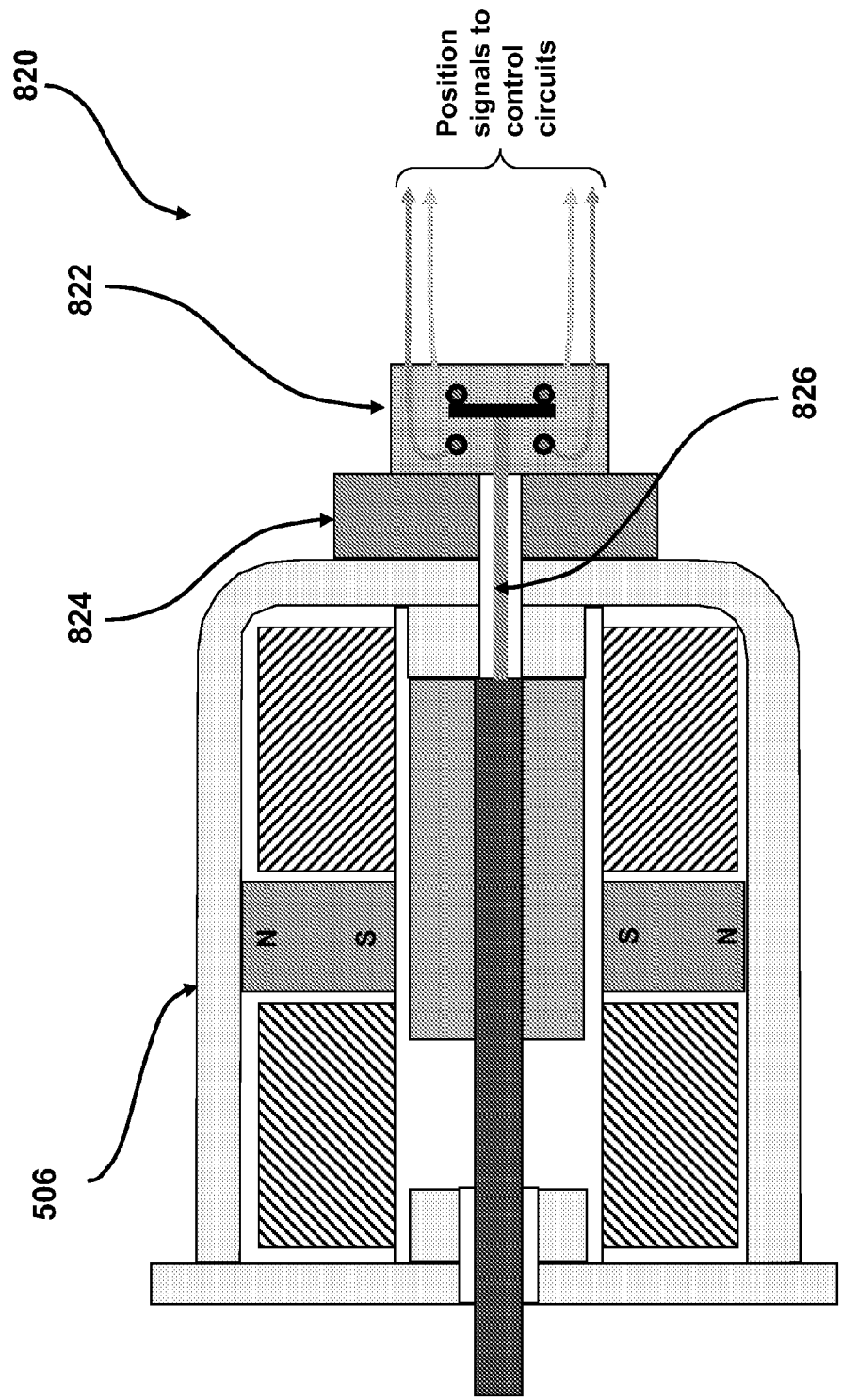

FIGS. 16A, 16B and 16C illustrate various PSDs that may be incorporated and used to detect the position of a solenoid such as magnetically latching solenoid 506 as discussed above. FIG. 16A illustrates an exemplary PSD 800. The PSD 800 may include a first reed switch 802*a* and a second reed switch 802*b*. A reed switch is an electrical switch activated by applying a magnetic field on or near the reed switch. The magnetic field attracts a movable contact within the reed switch, moving the movable contact against a stationary contact thereby establishing an electrical connection. Depending on the position of the movable steel armature within the solenoid 506, various portions of the solenoid's frame may be saturated with a magnetic field. For example, as shown in FIG. 16A, if the steel armature 514 is to the right of the solenoid 506, the steel frame 522 around the right coil 518 of the solenoid may be saturated with the magnetic field, and thus reed switch 802*b* would establish an electrical connection, indicating to the local PC board the position of the solenoid. Conversely, if the steel armature 514 is to the left of the solenoid 506, the steel frame 522 around the left coil 516 of the solenoid may be saturated with the magnetic field, and thus reed switch 802*a* would establish an electrical connection, indicating to the local PC board the position of the solenoid.

FIG. 16B illustrates an exemplary PSD 810. The PSD 810 may include a first semi-conducting switch 812*a* and a second semi-conducting switch 812*b*. An example of a semi-conducting switch is a Hall Effect sensor. A Hall Effect sensor is a transducer that varies its output voltage dependent upon the presence of a magnetic field. Depending on the position of the movable steel armature within the solenoid 506, various portions of the solenoid's frame may be saturated with a magnetic field. A steel bar and spacer 814 may be provided to concentrate any stray magnetic field directly onto one of the semi-conducting switches 812*a*, 812*b*. For example, as shown in FIG. 16B, if the steel armature 514 is to the right of the solenoid 506, the steel frame 522 around the right coil 518 of the solenoid may be saturated with the magnetic field, and thus semi-conducting switch 812*b* may alter its output voltage, thereby indicating to the local PC board the position of the solenoid. Conversely, if the steel armature 514 is to the left of the solenoid 506, the steel frame 522 around the left coil 516 of the solenoid may be saturated with the magnetic field, and thus semi-conducting switch 812*a* may alter its output voltage, thereby indicating to the local PC board the position of the solenoid. Detecting the position of an armature within a magnetically latching solenoid is further discussed in U.S. patent application Ser. No. 12/622,807 entitled "Position Sensor for Mechanically Latching Solenoid," the content of which is hereby incorporated in its entirety.

FIG. 16C illustrates an exemplary PSD 820. The PSD 820 may include micro-switch 822 mounted to the solenoid 506 via a mounting plate 824 and operably connected to the movable steel armature 514 of the solenoid via a push-rod 826. Depending on the position of the movable steel armature within the solenoid 506, the micro-switch 822 may be in a first or second position. For example, as shown in FIG. 16B, if the steel armature 514 is to the right of the solenoid 506, the micro-switch 822 may establish a first connection, thereby indicating to the local PC board the position of the solenoid. Conversely, if the steel armature 514 is to the left of the solenoid 506, the micro-switch 822 may establish a first connection, thereby indicating to the local PC board the position of the solenoid.

It should be noted that the embodiments shown in the included figures and discussed in the above text are shown by ways of example only, and those skilled in the art will appreciate that various modifications, alterations, and adaptions to the described embodiments may be realized without departing from the spirit and scope of the invention defined by the appended claims.

What is claimed is:

1. A bypass device comprising:
   a stationary portion of a first set of contacts connected to at least first and second output terminals of a power cell;
   a symmetrically magnetically latching solenoid that, when energized, moves a moving portion of the first set of contacts from a first position to a second position or from the second position to the first position; and
   at least one added insulating material positioned between the solenoid and the first set of contacts, and configured to allow a voltage between the magnetically latching solenoid and the first and second output terminals of the power cell to exceed a voltage between said output terminals.

2. The bypass device of claim 1, further comprising a flexible shaft comprising a non-conductive insulating material positioned between the magnetically latching solenoid and the first set of contacts and configured to move the moving portion of the first set of contacts between the first and second positions.

3. The bypass device of claim 1, wherein the added insulating material is positioned between the first set of contacts and the magnetically latching solenoid such that the first set of contacts can operate at a medium voltage and the solenoid can operate at or near ground potential.

4. The bypass device of claim 1, further comprising a control circuit connected to the bypass device.

5. The bypass device of claim 4, further comprising a position sensing device operably connected to the control circuit and configured to detect a position of the magnetically latching solenoid.

6. The bypass device of claim 5, wherein the position sensing device comprises at least one of a mechanically-driven micro-switch, a magnetically-driven reed switch, and a magnetically-driven semiconductor device.

7. The bypass device of claim 1, further comprising:
   a second set of contacts connected to a first input terminal of the power cell; and
   a third set of contacts connected to a second input terminal of the power cell.

8. The bypass device of claim 7, wherein the magnetically latching solenoid is further configured to move the second and third set of contacts.

9. The bypass device of claim 7, wherein the second and third set of contacts are vacuum contacts.

10. The bypass device of claim 7, wherein the second and third set of contacts comprise at least one arc chute.

11. The system of claim 1, wherein the local control is operably connected to a master control via one or more fiber optic control lines such that the local control is electrically isolated from the master control.

12. A system comprising:
   a multi-winding device having a primary winding and a plurality of three-phase secondary windings;
   at least one power cell is connected to a three-phase secondary winding of the multi-winding device; and
   a bypass device comprising:

a stationary portion of a first set of contacts connected to at least first and second output terminals of a power cell, a symmetrically magnetically latching solenoid that, when energized, moves a moving portion of the first set of contacts from a first position to a second position or from the second position to the first position, and at least one added insulating material positioned between the solenoid and the first set of contacts, and configured to allow a voltage between the magnetically latching solenoid and the first and second output terminals of the power cell to exceed a voltage between said output terminals.

13. The system of claim 12, wherein the added insulating material is positioned between the first set of contacts and the magnetically latching solenoid such that the first set of contacts can operate at a medium voltage and the solenoid can operate at or near ground potential.

14. The system of claim 12, further comprising a control circuit connected to the bypass device.

15. The system of claim 12, further comprising:

a second set of contacts connected to a first input terminal of the power cell; and a third set of contacts connected to a second input terminal of the power cell.

16. A system comprising:

a bypass device comprising:

a stationary portion of a first set of contacts connected to at least first and second output terminals of a power cell, and a symmetrically magnetically latching solenoid that, when energized, moves a moving portion of the first set of contacts from a first position to a second position or from the second position to the first position; and a local control operably connected to the bypass device and configured to operate at or near an electrical potential of the first set of contacts.

17. The system of claim 16, wherein the bypass device further comprises:

a second set of contacts connected to a first input terminal of the power cell; and a third set of contacts connected to a second input terminal of the power cell.

* * * * *